US011899122B2

(12) United States Patent
Smith

(10) Patent No.: US 11,899,122 B2
(45) Date of Patent: Feb. 13, 2024

(54) GEOLOCATING EMITTERS

(71) Applicant: Assured Information Security, Inc., Rome, NY (US)

(72) Inventor: Jason Eric Smith, Oneida, NY (US)

(73) Assignee: ASSURED INFORMATION SECURITY, INC., Rome, NY (US)

( * ) Notice: Subject to any disclaimer, the term of this patent is extended or adjusted under 35 U.S.C. 154(b) by 553 days.

(21) Appl. No.: 17/281,835

(22) PCT Filed: Dec. 10, 2020

(86) PCT No.: PCT/US2020/064178
§ 371 (c)(1),
(2) Date: Mar. 31, 2021

(87) PCT Pub. No.: WO2022/125091
PCT Pub. Date: Jun. 16, 2022

(65) Prior Publication Data
US 2022/0404453 A1 Dec. 22, 2022

(51) Int. Cl.
*H04W 4/02* (2018.01)
*H04W 64/00* (2009.01)
*G01S 5/02* (2010.01)

(52) U.S. Cl.
CPC ......... *G01S 5/0249* (2020.05); *G01S 5/0205* (2013.01)

(58) Field of Classification Search
CPC ........................ G01S 5/0249; G01S 5/0205
See application file for complete search history.

(56) References Cited

U.S. PATENT DOCUMENTS

| | | | |
|---|---|---|---|
| 10,330,769 B1* | 6/2019 | Mayer | G01S 5/0278 |
| 2004/0164901 A1* | 8/2004 | Karlsson | G01S 5/04 342/449 |
| 2006/0227664 A1* | 10/2006 | Horak | G01S 5/20 367/136 |
| 2010/0302014 A1 | 12/2010 | Gloo et al. | |
| 2013/0027251 A1* | 1/2013 | Lu | G01S 3/34 342/451 |
| 2017/0199269 A1 | 7/2017 | Allen et al. | |

OTHER PUBLICATIONS

Blachman, 'On Combining Target-Location Ellipses', IEEE Transactions on Aerospace and Electronic Systems, vol. Aes-25, No. 2, Mar. 1989, pp. 284-287.
International Search Report and Written Opinion for PCT/US2020/064178 completed Mar. 11, 2021, 15 pgs.

* cited by examiner

*Primary Examiner* — Moustapha Diaby
(74) *Attorney, Agent, or Firm* — Matthew M. Hulihan; Heslin Rothenberg Farley & Mesiti PC

(57) ABSTRACT

Geolocating one or more emitters includes obtaining a set of lines of bearing (LOBs) indicative of location(s) of emitter (s), determining intersections of LOBs of the set and generating clusters informed by those intersections, assigning the LOBs of the set to cluster(s) based on proximity, identifying a cluster having the greatest number of assigned LOBs from the set; determining an emitter location area based on a best point estimate for the cluster, and indicating a location of an emitter as the emitter location area. Additional emitters can be located by removing from the set of LOBs those LOBs assigned to the identified cluster, and repeating aforementioned aspects. Initially, the set of LOBs can be selected from a larger collection as a representative subset thereof.

20 Claims, 12 Drawing Sheets

GEOLOCATING EMITTERS

STATEMENT REGARDING FEDERALLY SPONSORED RESEARCH

This invention was made with government support under contract FA875019C0013 awarded by the Department of the Air Force. The government has certain rights in the invention.

BACKGROUND

Various geolocation tools are used to locate radio frequency emitters based on measurements taken from surveillance and other types of platforms. Typically these measurements include 'lines of bearing' (LOBs) taken when a collection platform encounters electromagnetic emissions from point source emitter(s). Such an emitter could be anything that emits radio frequency radiation. Examples include, but are not limited to, an FM radio or television broadcast tower, cellular tower, push-to-talk radio, WiFi hotspot, or radar, though many other examples exist. The particular frequencies of these emissions could be any that are capable of detection.

LOBs indicate the general direction of the emitter relative to the collection platform but they can be imprecise. Some facilities make use of a geolocation algorithm that performs calculations using measured LOBs to produce an oval ("ellipse") shaped overlay on the Earth that contains, with some confidence interval, say 95%, the location of the emitter that produced the emissions detected as the measured LOBs. The more LOBs that are used as input into the algorithm, the more accurate the ellipse becomes in terms of size and best estimate of the center point relative to the emitter's true location on Earth.

SUMMARY

Shortcomings of the prior art are overcome and additional advantages are provided through the provision of a computer-implemented method. The method includes obtaining a set of lines of bearing (LOBs) indicative of one or more emitter locations; determining spatial intersections of LOBs of the set of LOBs; generating a plurality of clusters informed by the spatial intersections; assigning each line of bearing (LOB) of the set of LOBs to a respective one or more clusters of the plurality of clusters based on proximity of the LOB to the one or more clusters; identifying a cluster, of the plurality of clusters, having a greatest number of LOBs from the set of LOBs assigned thereto; determining a best point estimate of the identified cluster and an ascertained emitter location area based on the best point estimate and on the LOBs assigned to the identified cluster; and indicating a location of an emitter as the ascertained emitter location area.

Further, a computer system is provided that is configured to perform methods described herein, such as the aforementioned method, as is a computer program product having a computer readable storage medium that stores instructions for execution to perform such methods.

Additional aspects are described. For instance, in an embodiment the method further includes updating the set of LOBs by removing from the set of LOBs those LOBs assigned to the identified cluster, and repeating, one or more times, the generating a plurality of clusters, the assigning, the identifying a cluster, the determining a best point estimate and ascertained emitter location area, the indicating a location, and the updating the set of LOBs, wherein the repeating iterates until the set of LOBs has been updated to reduce the set of LOBs to at or below some threshold number of LOBs, and wherein, at each iteration of the repeating, the ascertained emitter location area indicates a location of another emitter.

Additionally or alternatively, the obtaining the set of LOBs can include selecting the set of LOBs as a subset from a collection of LOBs. The selecting can include taking a representative sampling of LOBs from the collection of LOBs, and optionally further include ordering the collection of LOBs in an order based on a property of each LOB of the collection of LOBs, and taking the representative sampling as every $n^{th}$ LOB of the ordered collection of LOBs, where $n>1$.

Additionally or alternatively, a method can further include assigning to the identified cluster additional LOBs, where the additional LOBs are selected from the collection of LOBs and were not included in the set of LOBs, where the additional LOBs are selected and assigned to the identified cluster based on proximity of the additional LOBs to the identified cluster, and where the determining the ascertained emitter location area is based on the identified cluster including the additional LOBs assigned thereto. In example embodiments, the method includes updating the set of LOBs by removing from the set of LOBs those LOBs assigned to the identified cluster; updating the collection of LOBs by removing from the collection of LOBs the additional LOBs assigned to the identified cluster and that were not included in the set of LOBs; and repeating, one or more times, the generating a plurality of clusters, the assigning each LOB of the set of LOBs, the identifying a cluster, the assigning additional LOBs to the identified cluster, the determining the best point estimate and ascertained emitter location area, the indicating a location, the updating the set of LOBs, and the updating the collection of LOBs, wherein the repeating iterates until the set of LOBs has been updated to reduce the set of LOBs to at or below some threshold number of LOBs, and wherein, at each iteration of the repeating, the ascertained emitter location area indicates a location of another emitter.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Described herein are approaches for geolocating emitters precisely and efficiently based on measurements taken from surveillance platforms. Generation of emitter location indicators, referred to herein as 'emitter location areas', examples of which include containment probability ellipses depicted and described, can be a very computationally expensive process. As the number of measurements, e.g. LOBs involved in the computations, grows, conventional algorithms used to locate emitter(s) exhibit an exponential increase in computational requirements correlated to the quantity of input. Such algorithms cannot scale to meet the processing requirements identified for ongoing and future developmental efforts to geolocate emitters.

Figure 1:
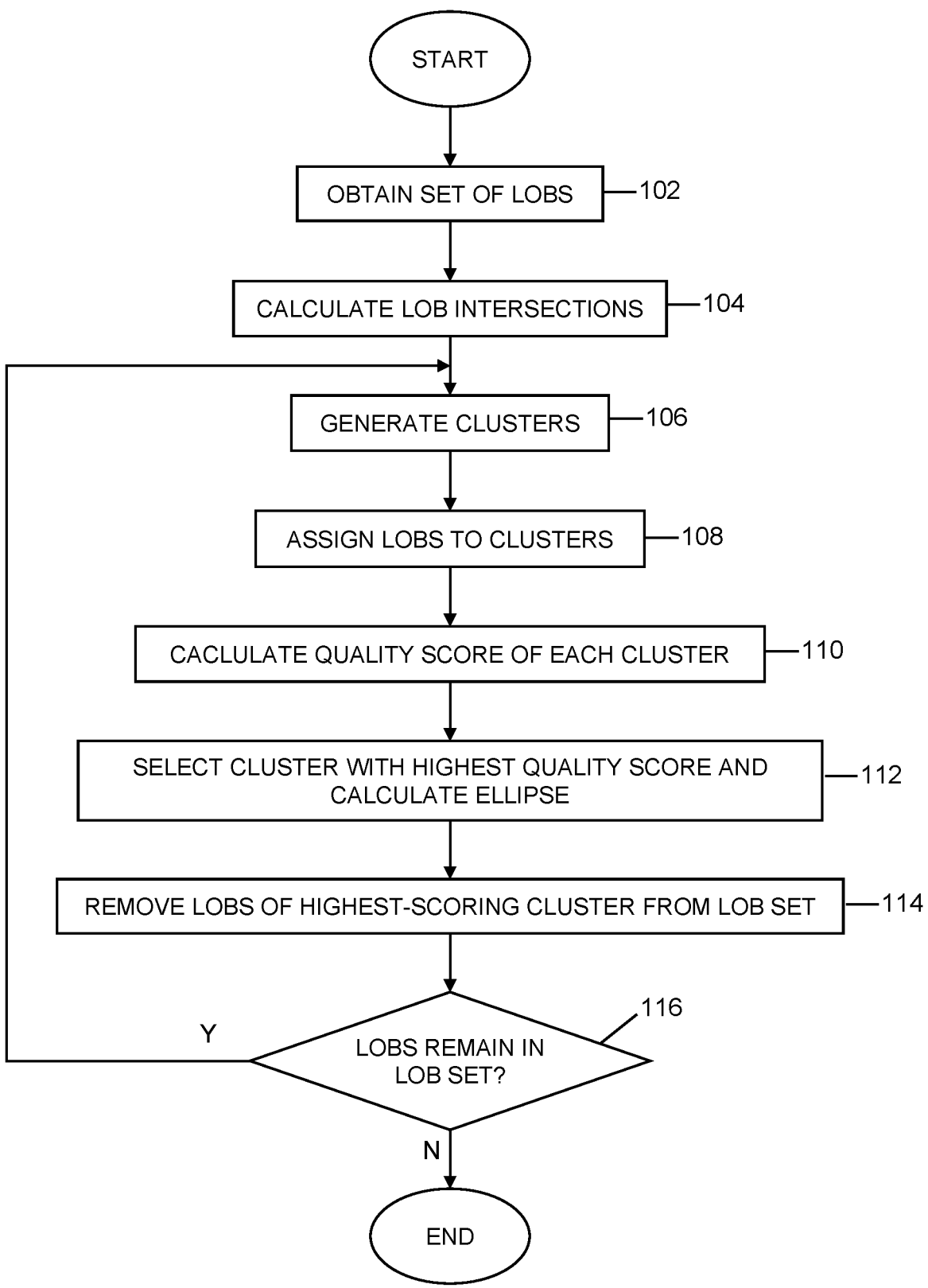
FIG. 1 depicts an example geolocation algorithm.

FIG. 1 depicts an example geolocation algorithm. The algorithm obtains (102) a set of LOBs (i.e. data values reflecting the measured lines of bearing) indicative of location(s) of emitter(s) and performs an iterative calculation on the set, producing at the end of each iteration an ellipse that contains a probable emitter location. More specifically, after obtaining the set of LOBs at 102, the algorithm calculates (104) all intersections where any two or more of such LOBs intersect in physical space. These intersections are termed spatial intersections herein. It generates (106) a cluster at each such intersection to inform a potential grouping of LOBs pointing to a same location. Each intersection of any two or more LOBs can be regarded as a cluster and therefore a potential location of an emitter.

The process continues by assigning (108) the LOBs to the clusters, and specifically assigning each LOB of the set of LOBs to a respective one or more of the cluster(s). This assigning is based on proximity of each LOB to the clusters; if a LOB is sufficiently close to an intersection, it may be deemed to be part of that cluster. Each LOB is evaluated against each cluster (intersection) to determine if it 'points to' that cluster within some standard deviation. If so, the LOB is assigned to, i.e. regarded as being part of, that cluster. A LOB may be assigned to more than one cluster if it is sufficiently close to each of such clusters that it could likely to point to any of them. The clusters in this regard indicate potential points from which detected radiation may have been emitted, and therefore a location of an emitter.

The process then calculates (110) a quality score of each cluster by determining a Best Point Estimate (BPE) for the cluster, which is regarded as the cluster's starting center location, and determining the quality of the cluster as a measure of how closely each LOB in the cluster points to the cluster's BPE. Quality can therefore be an aggregate measure of how far the assigned LOBs miss the BPE. The process selects (112) the cluster with the highest quality score as determined by 110 and calculates an ellipse indicating probable emitter location (within some confidence) based on the BPE and the LOBs in the cluster. The calculation of such an ellipse may be done by known methods. That cluster and the LOBs assigned thereto are deemed to indicate a probable emitter location. Since there may be other detected LOBs not assigned to the cluster, there is the possibility that such other LOBs were emitted from one or more other emitters.

The process continues by removing (114) from the set of LOBs those LOBs that were assigned to the selected cluster (i.e. the one that had the highest quality score). This process can iterate until the set of LOBs decreases to some threshold number, which could be any desired number zero or greater. Thus, a determination (116) is made as to whether LOBs (i.e. a number greater than the threshold) remain in the LOB set. If so (114, Y), the process returns to 106 to generate clusters at each remaining spatial intersection. Otherwise (114, N), the process ends.

It is seen that at each iteration the LOBs of the selected highest-quality cluster are removed from the set of LOBs to form an updated set of LOBs to use on the next iteration. Removal of the LOBs considered to be part of the selected best cluster in one iteration effectively reduces interference when generating the clusters on the next iteration.

Figure 2:
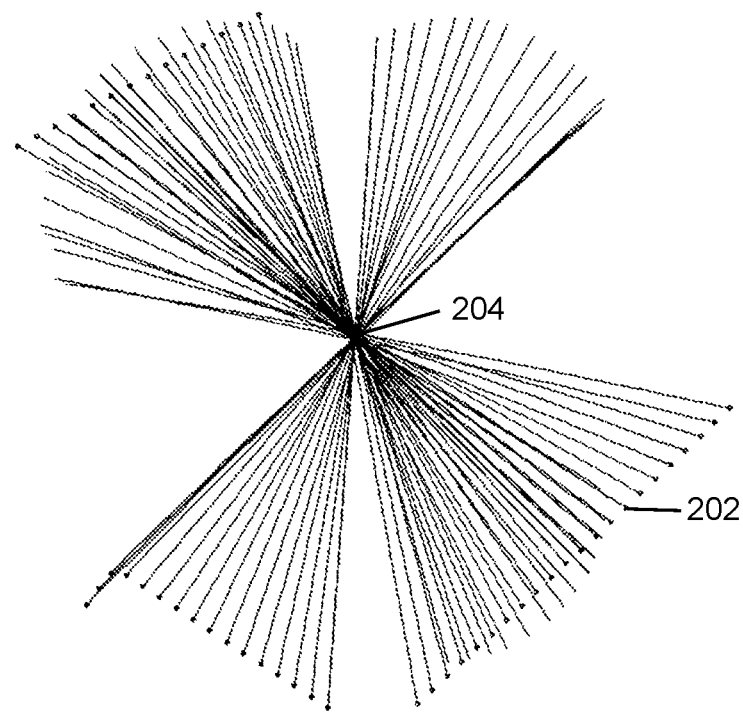
FIG. 2 depicts a plot of a simulation of LOBs emitted from an emitter.

To analyze the algorithm described above with reference to FIG. 1, a test bed was created that simulates a collection platform moving over a section of the Earth in a random point-to-point manner. The platform collects LOBs against simulated emitter(s) in the same area, and the algorithm above was used to generate ellipse(s) using the generated LOBs. Consider the scenario of FIG. 2, depicting a plot of a simulation of LOBs emitted from an emitter. Here, each line 202 represents a line of bearing (LOB). A high-level view as shown in FIG. 2 depicts the LOBs intersecting generally at a point 204 in the middle of the plot. The plot here depicts one from a single emitter with LOBs measured from three distinct platform fly-bys. The collection rate in this example is 0.05 LOBs per nautical mile traveled by the platform. 52 LOBs in total were measured against the emitter.

Figure 3:
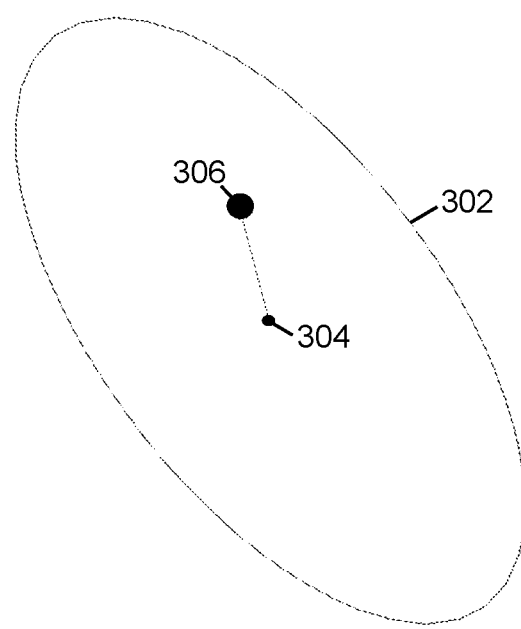
FIG. 3 depicts an example containment probability ellipse for the simulation of FIG. 2.

FIG. 3 depicts an example containment probability ellipse for the simulation of FIG. 2. The ellipse 302 was generated from these LOB measurements using the algorithm above. 304, the BPE for the cluster, is at the center of the ellipse and point 306 represents the true emitter location. Generation of the ellipse produces actual measurements of ellipse axial length and geographic coordinates of the BPE center point. Therefore, this can be readily overlaid on a map to define an actual geographic area on Earth.

Ellipses can be measured in terms of accuracy by how close they are to the true emitter and by their size. In the example of FIG. 3, the ellipse's center point 304 is roughly 0.1 nautical mile (nm) from the true emitter location 306, and the ellipse measures 535 meters (m) on its long (semi-major) axis and 255 m on its short (semi-minor) axis.

The above test case above was replicated with varying LOB densities, which refers to the number of LOBs in the set of LOBs against which the algorithm is run. Table 1 below shows the results of those simulations.

TABLE 1

Simulation Results for Original Geolocation
Algorithm, Varying LOB Counts

| Time (s) | LOBs | Miss Distance (m) | Semi Major (m) | Semi Minor (m) |
|---|---|---|---|---|
| 1.57 | 52 | −169.60 | 535.37 | 255.82 |
| 7.41 | 15 | −207.76 | 1389.09 | 390.92 |
| 7.41 | 101 | −79.01 | 318.48 | 90.20 |
| 20.79 | 17 | 474.86 | 650.57 | 214.98 |
| 20.79 | 148 | −21.08 | 160.08 | 112.47 |
| 46.43 | 25 | −143.05 | 326.07 | 42.11 |
| 46.43 | 7 | −4272.75 | 13371.83 | 529.76 |
| 46.43 | 8 | −2874.33 | 5122.53 | 164.91 |
| 46.43 | 193 | −42.57 | 135.32 | 35.46 |
| 79.18 | 33 | 203.62 | 448.70 | 175.86 |
| 79.18 | 253 | −53.36 | 125.55 | 68.11 |
| 119.04 | 308 | −21.13 | 111.05 | 47.39 |
| 186.96 | 362 | −9.45 | 42.33 | 7.10 |
| 267.27 | 409 | 25.06 | 83.14 | 39.84 |
| 328.18 | 74 | 26.00 | 103.46 | 41.64 |
| 328.18 | 71 | 30.04 | 100.72 | 41.67 |
| 328.18 | 451 | −10.42 | 71.90 | 38.29 |
| 383.19 | 95 | 70.69 | 151.29 | 49.67 |
| 383.19 | 84 | 27.59 | 125.76 | 44.60 |
| 383.19 | 496 | −14.4 | 69.81 | 32.17 |
| 306.43 | 96 | −68.29 | 93.27 | 58.45 |
| 306.43 | 556 | −13.90 | 63.24 | 26.15 |
| 348.99 | 618 | −29.03 | 63.28 | 29.70 |
| 461.15 | 672 | −33.81 | 44.27 | 25.00 |

Table 1 includes columns for: algorithm runtime in seconds ("Time (s)"), number of LOBs in the set ("LOBs"), the distance in meters by which the ellipse center missed the true emitter location ("Miss Distance (m)"), ellipse long-axis length in meters ("Semi Major (m)"), and ellipse short-axis length in meters ("Semi Minor (m)"). Rows with the same runtime are single-simulation runs where the algorithm determined that more than one emitter was present, given the LOBs in the subset. Those cases produce an obviously erroneous outcome because the simulation included just one emitter. Noteworthy from Table 1 is the exponential increase in algorithm run time with an increase in LOB count; a doubling of the LOB count results in more than a quadrupling of run time, for example.

Figure 4:
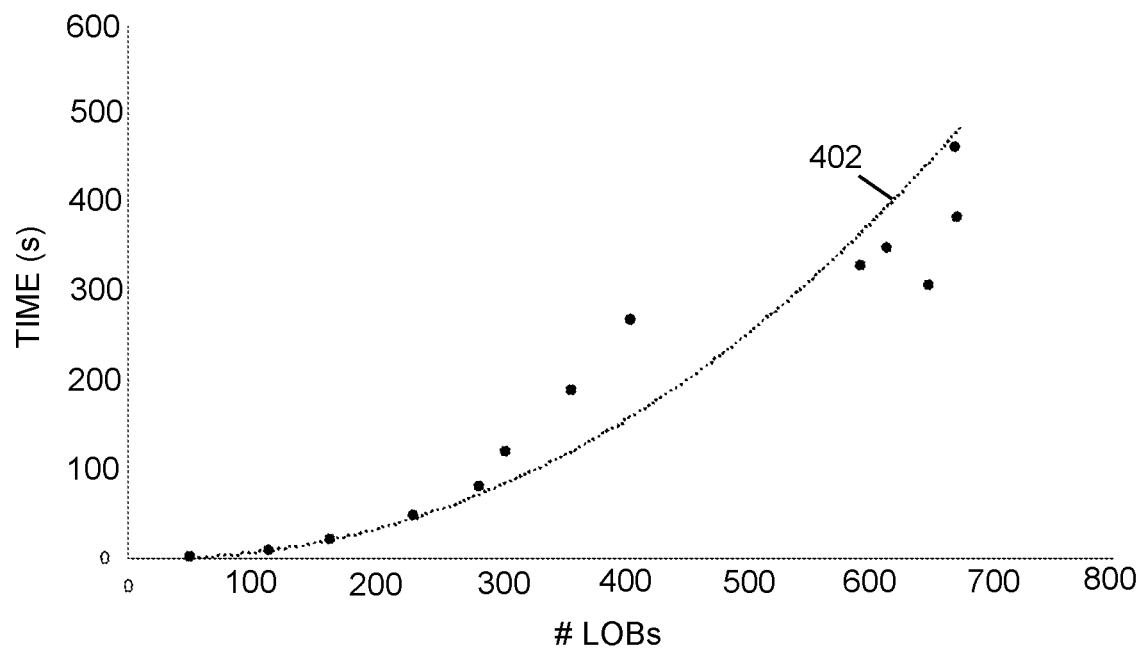
FIG. 4 depicts a graph of algorithm runtime based on number of LOBs.

FIG. 4 depicts a graph of algorithm runtime based on number of LOBs. Curve 402 represents the best fit of the included samples, and it is seen that the runtime begins to increase sharply after about 300 LOBs. Practical use cases for generation of an emitter location area (e.g. the de-facto standard shape of which is an ellipse, though could be any other desired shape) for geolocation of emitters can involve LOB counts hundreds of times greater than the numbers shown above. Such high LOB counts facilitate very precise geolocation of emitters but are currently problematic because, as shown in the chart above, even 600 LOBs costs over five minutes of computation using a modern, capable computer system to perform the calculations.

To help highlight why the geolocation algorithm takes relatively long to complete, a detailed analysis was performed on each of the following algorithmic subsections: Calculating LOB intersections, assigning LOBs to clusters, calculating cluster BPEs, calculating cluster qualities, selecting cluster with highest quality score and calculating ellipse, and removing LOBs of the highest-quality cluster from the LOB set. There was clearly a bottleneck during the calculation of the clusters' BPEs.

Data presented above, particularly in Table 1, illustrates two issues with the geolocation algorithm discussed above: computational complexity and solution inaccuracy. With respect to the algorithm's computational complexity, the algorithm is structured such that as the number of LOBs grows, the run time of the algorithm grows exponentially, as was demonstrated above. The reason for this exponential growth is because each LOB intersection is a potential cluster and as more LOBs are considered, the number of LOB intersections grows exponentially. The number of potential intersections to evaluate is at most $(n^2-n)/2$ where n is the number of LOBs. Not all LOBs cross all others in a typical collection scenario, and thus this is the upper limit. For a set of 3,000 LOBs, there are potentially 4,498,500 clusters to evaluate. This complexity, combined with the fact that, for each cluster and each LOB, it must be evaluated and determined whether or not the LOB is associated with that cluster, yields an expensive algorithm with a run-time-complexity of $O(n^3/2)$. For an input set of 100,000 LOBs, there would potentially be over half a quadrillion calculations to perform.

The breakdown of algorithm runtime by subsection, discussed above, showed that calculating the BPEs for the clusters takes over 99% of the total run time. This portion of the calculation is an iterative convergence algorithm that requires multiple passes and evaluations, and that uses all of the clusters' LOBs multiple times in each pass in order to find the clusters' BPEs. Thus, in accordance with an aspect described herein, an approach to a geolocation algorithm is taken that removes the need for calculating all cluster BPEs. This approach is taken to reduce the runtime of such an algorithm.

Table 1 above exposes another flaw in the geolocation algorithm: random variance is being mistaken for cluster quality. During each iteration, the original algorithm described above with reference to FIG. 1 aims to select the best cluster based on the amount that the LOBs assigned to each cluster miss that cluster's center. With enough LOBs to consider, clusters can, and are, created that have excellent quality scores only because their LOBs by random chance cross at nearly the exact same location. This leads to erroneous geolocation ellipses being generated and presented to users.

Figure 5:
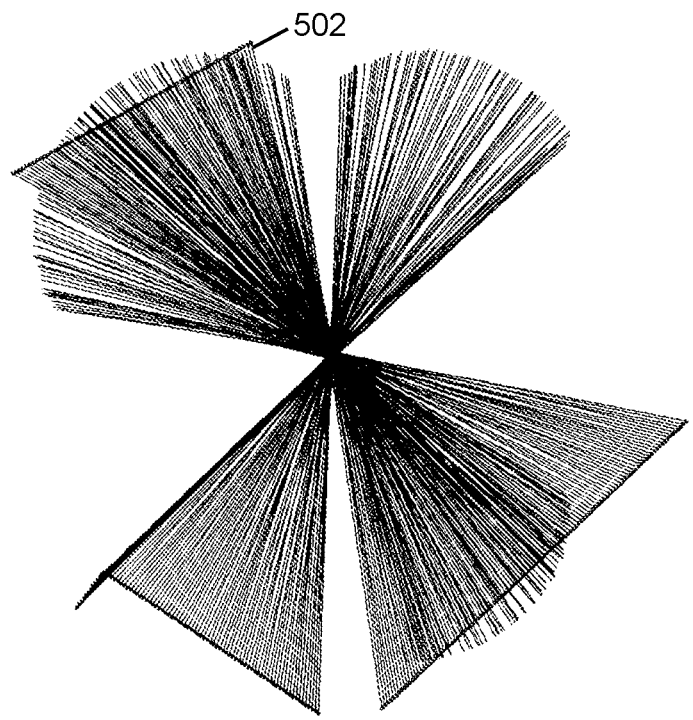
FIG. 5 depicts a plot of another simulation of LOBs emitted from an emitter.
Figure 6:
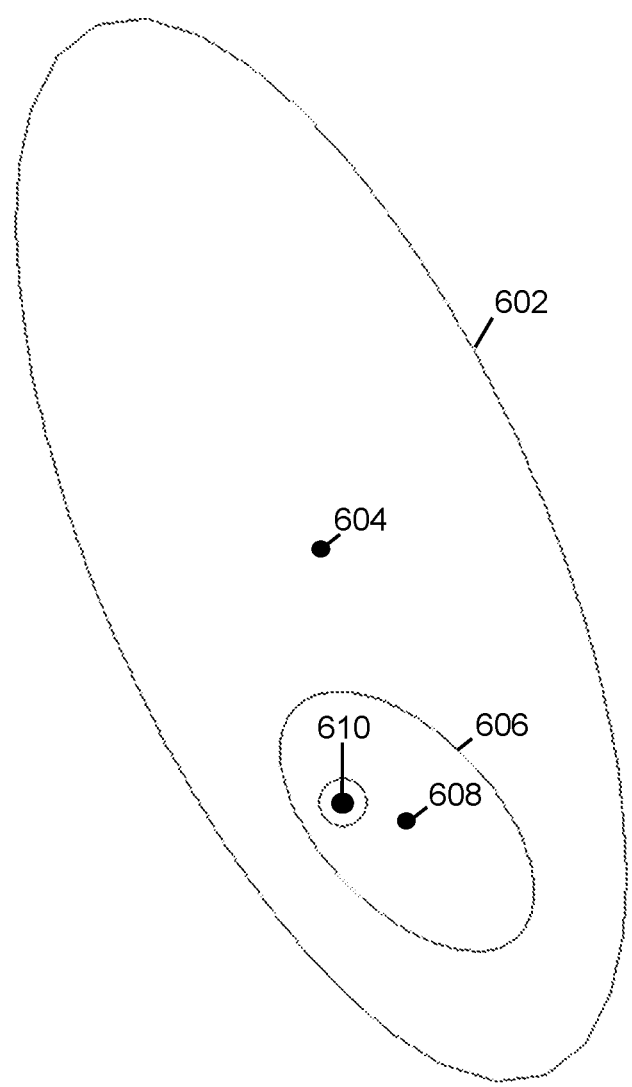
FIG. 6 depicts example containment probability ellipses for the simulation of FIG. 5.

FIGS. 5 and 6 show data from a test case above. FIG. 5 depicts a plot of another simulation of LOBs emitted from an emitter. In this case, there were 286 LOBs, each indicated by a line 502. FIG. 6 depicts example containment probability ellipses generated using the original algorithm above for the simulation of FIG. 5. The algorithm identified two clusters—one corresponding to ellipse 602 with center point 604, and another corresponding to ellipse 606 with center point 608. Here, the algorithm constructed and presented two ellipses, for two clusters, and therefore indicates two emitters. In fact, there was one true emitter (indicated by 610) in this example. Both ellipses 602, 606 are very good 'hits' on the emitter 610, but this presents a problem in that it conveys the presence of two emitter when there is really just one.

Accordingly, aspects presented herein address issues that included, but are not limited to, those of runtime and solution accuracy when computing emitter geolocations from sets of LOBs.

In one aspect, which addresses at least issues of algorithm runtime, a new cluster selection approach is presented. This selection approach takes advantage of the problem's topology by making the supposition that the cluster with the most LOBs is also the best cluster. This approach is referred to herein as a Quick-Pick (QP) approach. It reduces the number of clusters to be evaluated down to a constant number, typically one, and results in better computational performance as well as better ellipse results. This is at least because it avoids the problem of selecting clusters that, due to random variation in the LOBs, might happen to have high quality scores.

In accordance with aspects of the QP approach, a process obtains a set of LOBs indicative of one or more emitter locations and determines spatial intersections of LOBs of that set of LOBs. In one example, all LOBs are considered in determining spatial intersections, though in other examples the set is subject to a quality or other filter to produce a more accurate starting set of LOBs. In any case, the process generates a plurality of clusters informed by the spatial intersections. The process assigns each LOB of the set of LOBs to a respective one or more clusters of the plurality of clusters based on proximity of the LOB to the one or more clusters. As with the algorithm discussed previously with reference to FIG. 1 (and referred to herein as the 'original' algorithm), a given LOB may be assigned to more than one cluster. The process identifies which cluster, of the plurality of clusters, that has the greatest number of LOBs from the set of LOBs assigned to it. That selected cluster is considered to be the best (highest quality) cluster. This is in contrast to the original algorithm, which considers every intersection as warranting some evaluation after assigning the lobs to the clusters. In other words, the original algorithm evaluates all of the clusters and scores them for quality. In the QP approach, however, the cluster with the greatest number of LOBs assigned to it is identified after the LOBs of the set are assigned to the clusters, and the algorithm progresses with respect to that identified cluster, thus avoiding any quality scoring of each cluster. At that point, the process can determine a best point estimate of the identified cluster and then an ascertained emitter location area, i.e. a probable emitter location area, such as an elliptical area, based on the best point estimate and on the LOBs assigned to the identified cluster. This ascertained emitter location area can then be presented to a user, e.g. as a graphical or other output, indicating a location of an emitter as the ascertained emitter location area.

Data comparing the QP algorithm with the original algorithm under the established test conditions of a single emitter and the same platform track as was used previously was gathered for both the original and the QP algorithm with different LOB collection rates. The results are presented in Tables 2 and 3.

TABLE 2

Simulation Results for Original Geolocation Algorithm, Varying LOB Counts

| Lobs | Time (ms) | Miss Distance (m) | Semi Major (m) | Semi Minor (m) |
|---|---|---|---|---|
| 11 | 57 | −121.665245 | 1942.270388 | 523.117286 |
| 28 | 483 | −758.439005 | 1722.473161 | 477.8101895 |
| 52 | 1610 | −169.599073 | 535.3709436 | 255.8193298 |
| 69 | 3585 | −147.259063 | 496.1027642 | 162.0390516 |
| 93 | 6740 | −120.761977 | 344.1785993 | 129.5677532 |
| 114 | 9702 | −93.692487 | 287.3600992 | 95.27924898 |
| 133 | 14307 | −51.6598204 | 269.2549908 | 124.6617206 |
| 148 | 19259 | −21.0761492 | 160.0822113 | 112.4697486 |
| 175 | 23536 | −24.3213012 | 154.3595698 | 118.6312894 |
| 192 | 28861 | −47.28517 | 144.8883196 | 39.65331812 |

TABLE 3

Simulation Results for QP Geolocation Algorithm, Varying LOB Counts

| Lobs | Time (ms) | Miss Distance | Semi Major | Semi Minor |
|---|---|---|---|---|
| 11 | 39 | −121.665245 | 1942.270388 | 523.117286 |
| 31 | 61 | −544.485208 | 1211.62277 | 398.0070633 |
| 52 | 94 | −169.599073 | 535.3709436 | 255.8193298 |
| 72 | 309 | −152.172695 | 494.7276405 | 160.9225848 |
| 93 | 525 | −120.761977 | 344.1785993 | 129.5677532 |
| 114 | 808 | −93.692487 | 287.3600992 | 95.27924898 |
| 136 | 1084 | −44.6976367 | 248.6835096 | 124.6569242 |
| 153 | 1730 | −15.7300965 | 155.9668325 | 61.45965179 |
| 175 | 1976 | −24.3213012 | 154.3595698 | 118.6312894 |
| 195 | 2024 | −44.9282147 | 143.7023261 | 39.64995653 |

The rows of Table 2 with bold numerical values indicate test cases where the original algorithm failed to correctly identify the single emitter and instead reported two or more result ellipses. In this case, the values of the smallest ellipse are reported. Note the reduced runtimes (in milliseconds—ms) and increased accuracy of the QP algorithm in comparison to those of the original algorithm. The QP algorithm correctly computed a single ellipse for each test case.

For further comparison, Table 4 below shows BPE calculation times of the original algorithm verses the QP algorithm for three different LOB counts.

TABLE 4

Cluster BPE Computation time-Original vs. QP

| | 258 LOBs | 517 LOBs | 776 LOBs |
|---|---|---|---|
| Calculate the Clusters' BPEs-Original | 393,162 ms | 1,400,951 ms | 2,931,845 ms |
| Calculate the Clusters' BPEs-QP | 2787 ms | 11499 ms | 14175 ms |

As expected, the QP algorithm is far faster when considering time taken to compute cluster BPEs. Indeed, BPE calculation times have been reduced by up to 99.52%.

Not all LOB sets will always contain measurements from a single emitter. The QP algorithm can also handle these multi-emitter cases as well. Initially, as discussed above, the algorithm selects the most LOB-dense cluster (i.e. the cluster with the most LOBs assigned thereto) and determines the BPE and ascertained emitter location area, for instance as an ellipse or other shape, taking this to indicate the location of a first emitter. The process at that point updates the set of LOBs to remove therefrom those LOBs that were assigned to the identified most LOB-dense cluster. If the set of LOBs has not yet been reduced to some threshold number (which may be some number zero or greater) from the removal of LOBs therefrom, the process repeats the generation of clusters, the assigning, the identifying a cluster with the most LOBs assigned, the determining a best point estimate and an ascertained emitter location area, the indicating a location for that emitter, and updating the set of LOBs. This iterates until the set of LOBs has been updated to reduce the set of LOBs to at or below the threshold number of LOBs at which to stop. At each iteration of the repeating, the ascertained emitter location area indicates a location of another emitter.

Though the threshold discussed above could be any number, in some practical examples the threshold number is 2 or 3 LOBs. Practically speaking, even three lobs might be regarded as a cluster indicative of an emitter and therefore it may be determined to iterate the algorithm again as long as three or more LOBs remain in the set of LOBs.

Figure 7:
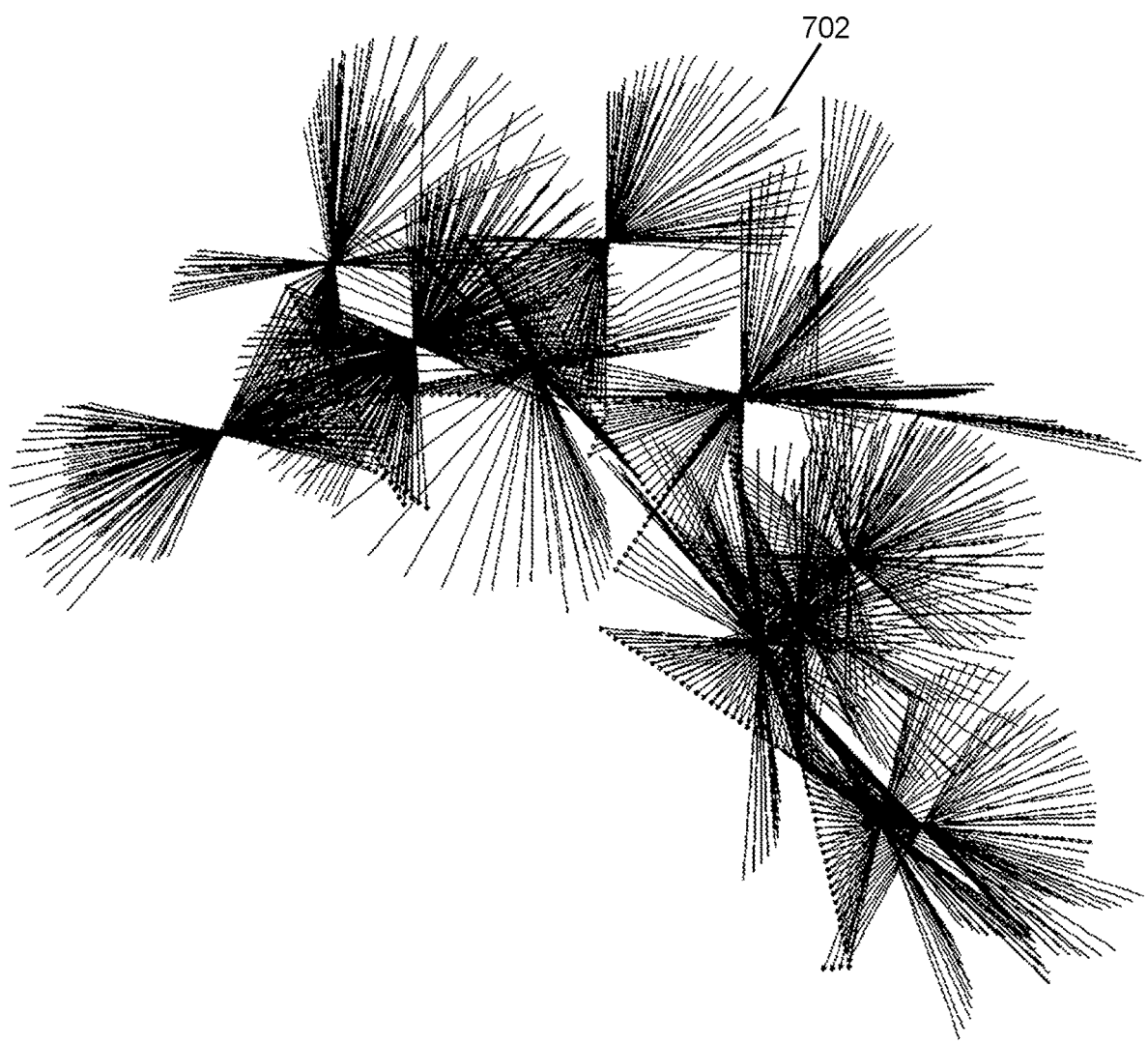
FIG. 7 depicts a plot of a simulation of LOBs from a 15-emitter test case.

FIG. 7 depicts a plot of LOBs from a 15-emitter test case. Again, each line 702 represents a LOB. 857 total LOBs are present, with a high degree of LOB cross-over, where LOBs intersect even in cases where they clearly do not point to the same emitter. Such intersections are valid potential cluster locations and are to be evaluated and, ideally, eliminated as potential emitter locations.

Computation times and results for running both the original and the QP algorithms against this test case are presented in Table 5 below.

TABLE 5

QP vs. Original Algorithm, Multiple Emitter Case

| | Original | | | | QP | | |
|---|---|---|---|---|---|---|---|
| Time (ms) | Lobs | Miss Distance (m) | Semi Major (m) | Semi Minor (m) | Time (ms) | Lobs | Miss Distance (m) | Semi Major (m) | Semi Minor (m) |
| 222670 | 51 | 259.55 | 659.01 | 153.56 | 23567 | 137 | 90.16 | 328.38 | 143.02 |
| | 52 | 176.96 | 648.83 | 181.57 | | 95 | 13.48 | 79.50 | 31.74 |
| | 9 | 34741.77 | 1621.87 | 400.14 | | 80 | 50.28 | 117.13 | 67.32 |
| | 10 | 13439.92 | 9326.34 | 812.73 | | 72 | 194.62 | 617.15 | 209.44 |
| | 3 | 94413.56 | 3891.70 | 1436.06 | | 73 | 65.07 | 136.01 | 59.78 |
| | 3 | 15493.76 | 2146.13 | 447.94 | | 64 | 156.91 | 180.15 | 92.03 |
| | 6 | 326.16 | 3755.72 | 551.66 | | 65 | 60.99 | 182.60 | 30.56 |
| | 4 | 4085.8 | 12280.42 | 639.40 | | 62 | 17.42 | 317.86 | 208.53 |
| | 70 | 58.16 | 180.56 | 60.55 | | 57 | 268.89 | 468.53 | 115.81 |
| | 62 | 61.88 | 182.70 | 30.67 | | 55 | 97.37 | 199.99 | 173.55 |
| | 92 | 56.45 | 483.86 | 150.79 | | 13 | 35107.29 | 1629.68 | 207.44 |
| | 135 | 109.01 | 335.32 | 144.10 | | 10 | 65.32 | 4732.35 | 694.21 |
| | 60 | 23.13 | 368.08 | 209.49 | | 59 | 128.07 | 205.39 | 25.36 |
| | 80 | 50.28 | 117.13 | 67.32 | | | | | |
| | 70 | 146.25 | 286.56 | 99.84 | | | | | |
| | 59 | 128.07 | 205.39 | 25.36 | | | | | |
| | 3 | 53634.42 | 814.52 | 571.93 | | | | | |
| | 3 | 16356.94 | 232.36 | 25.97 | | | | | |
| | 65 | 76.97 | 102.92 | 83.97 | | | | | |
| Average | | 12296.79 | 1981.02 | 320.69 | | | 2793.53 | 707.29 | 158.37 |

In this test case, the QP algorithm demonstrates its ability to distinguish valid clusters from invalid ones more reliably than the original algorithm, correctly picking 13 of the 15 true emitters for which there were sufficient LOBs in the test data, versus the 19 emitters the original algorithm reported. Furthermore, the QP algorithm is still 89.41% faster for this test, and maintains its ability to make more accurate ellipses in terms of ellipse miss distance and ellipse size.

Figure 8:
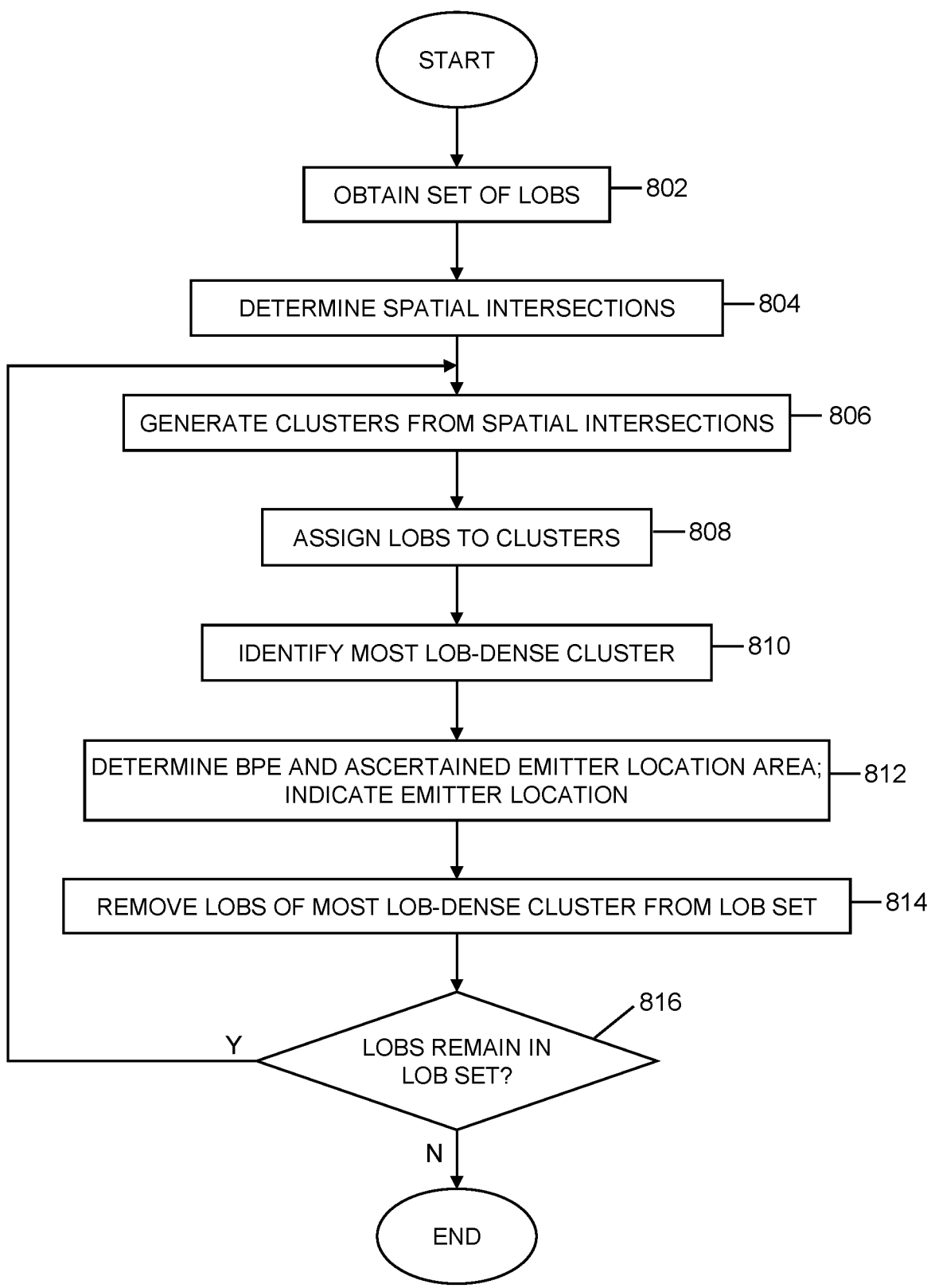
FIG. 8 depicts an example quick-pick geolocation process in accordance with aspects described herein.

Accordingly, FIG. 8 depicts an example quick-pick geolocation process in accordance with aspects described herein. In some examples, the process is performed by one or more computer systems, such as those described herein.

The process obtains (802) a set of LOBs indicative of one or more emitter locations, then determines (804) spatial intersections of LOBs of the set of LOBs. The process generates (806) a plurality of clusters informed by the spatial intersections, and assigns (808) each LOB of the set of LOBs to a respective one or more clusters of the plurality of clusters based on proximity of the LOB to those one or more clusters. The process then identifies (810) a cluster, of the plurality of clusters, having a greatest number of LOBs from the set of LOBs assigned thereto (i.e. the most LOB-dense cluster). For that identified cluster, the process determines (812) a best point estimate of the identified cluster and an ascertained emitter location area based on the best point estimate and on the LOBs assigned to the identified cluster. The ascertained emitter location area conveys a probabilistic (i.e. with some threshold confidence) area in which the emitter is located. The process also indicates a location of an emitter as the ascertained emitter location area. Indicating the location could be a conveyance of the emitter location area to a user, for instance by generating and providing graphical elements on a display screen for the to visualize the ascertained emitter location area, perhaps in relation to a map of a portion of Earth, and/or by displaying, outputting, or otherwise providing geographic coordinates describing the ascertained emitter location area to the user.

At that point, the process can end (for example if it is known that the set of LOBs is obtained from only a single emitter), or optionally continue as in FIG. 8 with updating the set of LOBs by removing (814) from the set of LOBs those LOBs assigned to the identified cluster, and then determining (816) whether at least some threshold number of LOBs remain in the LOB set. If so (816, Y), the process iterates by returning to 806 and repeating the generating a plurality of clusters (806), the assigning (808), the identifying (810) a cluster, the determining (812) a best point estimate and an emitter location area, and indicating a location, and the updating the set of LOBs (814). This can iterate (via inquiry 816) one or more times until the set of LOBs has been updated to reduce the set of LOBs to at or below some threshold number of LOBs. At each iteration of the repeating, the ascertained emitter location area that is determined on that iteration at 812 indicates a location of another emitter.

Table 6 presents run times for a single emitter case using the QP algorithm across a selection of LOB counts (i.e. ranging from 171 to 3103 LOBs).

TABLE 6

QP Algorithm Run Times-High LOB Counts

| Time (ms) | Lobs | Miss Distance (m) | Semi Major (m) | Semi Minor (m) |
|---|---|---|---|---|
| 2135 | 171 | 15.71480066 | 147.8675453 | 110.092313 |
| 4186 | 344 | 14.63282973 | 106.7348177 | 42.4450711 |

TABLE 6-continued

QP Algorithm Run Times-High LOB Counts

| Time (ms) | Lobs | Miss Distance (m) | Semi Major (m) | Semi Minor (m) |
|---|---|---|---|---|
| 13097 | 515 | −15.60124797 | 69.54265793 | 25.6256736 |
| 19167 | 688 | −32.48862948 | 44.49829594 | 25.0691337 |
| 35997 | 859 | −31.20158312 | 42.54642671 | 32.5209565 |
| 68103 | 1031 | −1.338001985 | 37.66695249 | 17.9182171 |
| 106179 | 1207 | −2.769017226 | 11.65237531 | 3.86888999 |
| 156752 | 1376 | 12.32388627 | 28.2595461 | 15.5330759 |
| 293778 | 1551 | 5.086362989 | 12.30500892 | 3.80325371 |
| 669087 | 2069 | 8.081838214 | 16.46628844 | 3.87825759 |
| 3890749 | 3103 | 1.585115009 | 5.008861345 | 2.61370737 |

It is easy to see that the QP algorithm has progressed well beyond what the original algorithm was capable of in terms of timing and accuracy. Nevertheless, additional gains in performance can be made in accordance with aspects presented herein. As noted above, the complexity of the original algorithm is $$O\left(\frac{n^3}{2}\right),$$

where n is the number of LOBs. For 3,000 LOBs and the roughly 5 million resultant potential clusters, each cluster evaluates all 3,000 LOBs for potential assignment, bringing the total number of calculations to just under 13.5 billion. The issue of BPE searching, which was by far the most expensive portion of the original geolocation algorithm, was addressed above. The issue of increased runtime with higher LOBs counts—termed herein the 'baseline complexity issue'—is next addressed. This runtime bottleneck becomes more noticeable when the QP algorithm processes a set of LOBs with a count in the thousands. A geolocation algorithm able to handle these higher LOB counts is desirable because, as can be seen in the table above, there are still gains to be made in terms of ellipse size and placement accuracy as the number of LOBs increases into the several-hundreds or thousands.

In order to reduce the complexity of the problem, an approach presented herein reduces the initial problem space by taking a representative sampling/subset of LOBs from an initial or starting set of LOBs, termed herein the overall 'collection' of LOBs, and then selecting the best cluster from that set (per the QP approach above), and then backfilling the selected most LOB-dense cluster with additional LOBs from the collection (that were not included in the representative sample) that point to the selected cluster, e.g. within some distance/deviation. Ascertained emitter location area (e.g. ellipse) computations are then performed on the backfilled cluster.

The approach of selecting a representative subset of LOBs is referred to herein as a Quick-Select (QS) approach. The QP and QS approaches can be used together in what is referred to herein as a Quick-Pick, Quick-Select (QPQS) approach. In the context of FIG. 8, the QS approach can be incorporated such that the 'obtaining the set of LOBs' (802) encompasses a selection of that set of LOBs as a proper subset from some larger collection of LOBs, for instance a measurement dataset. The process proceeds using that subset, termed the "set of LOBs" in FIG. 8, i.e. by determining spatial intersections of those LOBs, generating the clusters, etc.

Selecting the representative subset takes a 'representative' sampling of LOBs from the collection of LOBs. Various sampling approaches could be used for selecting this representative subset. As one example, the representative LOBs are selected at random from the collection. Other approaches may be based on some targeted selection of LOBs, for instance based on the properties of the LOBs in the collection. In some examples, selecting the representative sampling of LOBs from the collection is done by ordering the collection of LOBs in an order based on one or more properties of each LOB of the collection of LOBs and then taking the representative sampling from that ordered collection of LOBs, for instance by taking every $n^{th}$ LOB of the ordered collection of LOBs, where n>1. Other approaches may take every $n^{th}$ LOB but from an unordered collection of LOBs.

As one specific example of taking a representative sampling, the selection is based on LOB orientations. The orientation of a LOB is a measure of the direction/distance of the LOB (usually measured in degrees) relative to some reference, for instance true North, and is an example property of that LOB. From those orientations, the orientation difference between any two LOBs can easily be determined. LOBs that intersect each other at greater orientation differences (i.e. closer to perpendicular to each other) give more information about an emitter than LOBs that intersect as lesser orientation differences. Perpendicularly intersecting LOBs (orientated at 90 degrees relative to each other) provide more precise information in terms of indicating their intersection location than do LOBs intersecting with an angular distance of less than 90 degrees; the closer the orientations are of two LOBs (i.e. the 'more parallel' the LOBs are to each other), the more deviation there can be in their indicated intersection location.

Figure 9A:
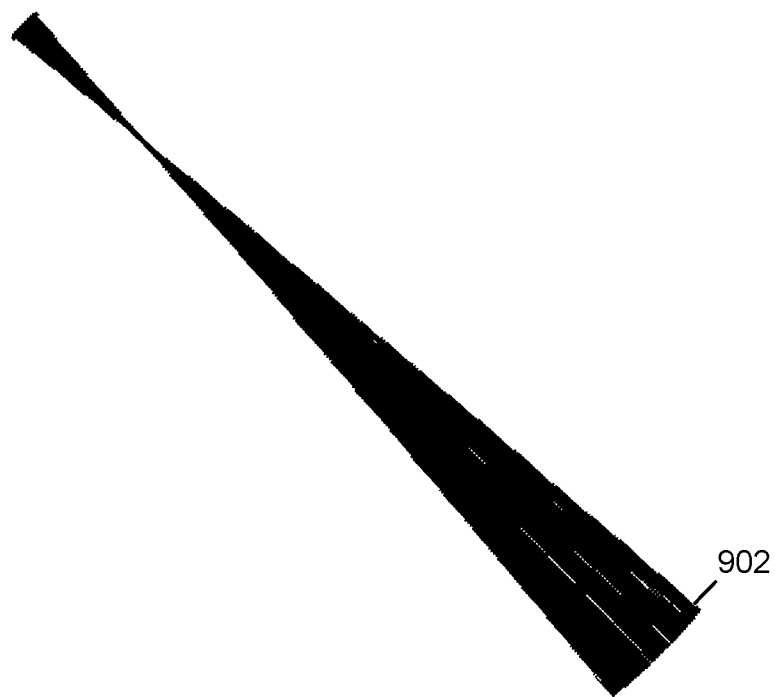
FIG. 9A depicts an example plot of LOBs having relatively small differences in orientation relative to each other.
Figure 9B:
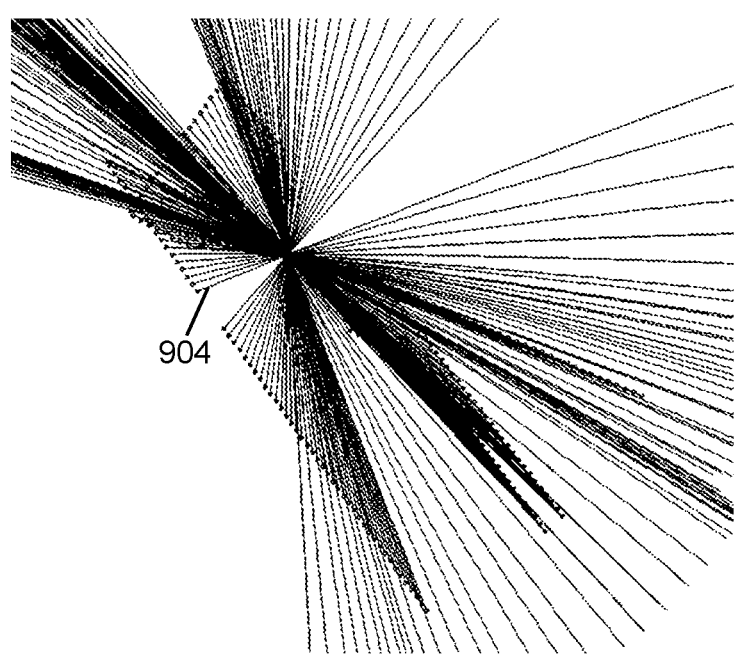
FIG. 9B depicts an example plot of LOBs having relatively large differences in orientation to each other.

FIG. 9A depicts an example plot of LOBs 902 having relatively small differences in orientation relative to each other. Here there are 204 LOBs presented in relatively close orientation to each other, resulting in a very tight plot in which angular distances between LOBs are very small. In contrast, FIG. 9B depicts an example plot of LOBs 904 having relatively large differences in orientation relative to each other. Here there are 204 LOBs presented in relatively distant orientation to each other, resulting in a plot in which spaces between LOBs are relatively large.

Using LOB data for the LOBs presented in FIGS. 9A and 9B, a respective ellipse was calculated for each of these two sets of 204 LOBs. The LOBs in FIG. 9A clearly involve those with smaller differences in orientation, whereas those of FIG. 9B involve LOBs with greater differences in orientation. For the narrow orientation range (FIG. 9A), the miss distance from the emitter was 110.13 m, the semi major axis of the ellipse was 185.42 m, and the semi minor axis of the ellipse was 11.96 m. For the widely separated orientations (FIG. 9B), the miss distance from the emitter was 1.28 m, the semi major axis of the ellipse was 14.79 m, and the semi minor axis of the ellipse was 6.86 m. For all measures, the ellipse from the broader LOB orientation range (FIG. 9B) is more precise.

This informed a LOB selection algorithm to select a representative sampling/subset from a larger collection of LOBs in order to maximize the added utility of each LOB being added to the representative subset. Selecting the representative subset (i.e. the 'set of LOBs' which the algorithm processes) from the collection can include iteratively identifying and adding to the set of LOBs a next LOB from the collection of LOBs, where identifying that next LOB is based on (i) an orientation of that next LOB and (ii)

the orientations of the LOBs already in the set of LOBs. More specifically, for any LOB in the collection, it can be determined how closely oriented it is to its nearest-oriented LOB that already appears in the representative subset. The next LOB to select from the collection and add to the representative subset can be the LOB, of the collection of LOBs, having an orientation that differs most/greatest from the orientation of its nearest-oriented LOB that is already in the representative subset of LOBs. By nearest-oriented is meant the LOB that is 'most parallel' with (lowest angular distance between) the LOB. It is desired to select from the collection and add to the subset the LOB that is most distant in terms of orientation (i.e. closest to perpendicular) from whatever is its nearest LOB already in the subset. Stated slightly differently, when selecting the next LOB from the collection to add to the representative sampling/subset, the next LOB selected, of all of the LOBs of the collection not already in the subset, is the LOB that has the greatest distance (i.e. closest to perpendicular) in orientation from whatever LOB, already in the representative subset, is its closest neighbor in terms of orientation. In this way, LOBs are chosen evenly across orientation distributions. This also serves to limit the number of redundant LOBs in the representative sampling in case there are sets of LOBs whose elements have similar orientations and originations, since that limits their usefulness in the overall ellipse computation.

With the representative subset of LOBs selected, the process can proceed as in FIG. 8 where the representative subset is the "set of LOBs", and the process performs: determining spatial intersections of those LOBs, generating the clusters, assigning those LOBs to the generated clusters, and then identifying and selecting the most LOB-dense cluster. At that point the process can backfill the selected cluster (explained below), then the proceed by determining the BPE and ascertained emitter location area from that (backfilled) cluster of LOBs, and then regarding the result as an indicator of an emitter location. The process can then remove from the set of LOBs (the representative subset) those LOBs that were assigned to the most LOB-dense cluster, and remove from the collection of LOBs any that were backfilled into the cluster. If some number of LOBs (above some threshold) remain in the representative subset at that point, the process can return back to cluster generation and iterate one or more times to identify a respective one or more locations of additional emitter(s).

The outlined method of selecting representative LOBs from the collection based on LOB orientation, while providing a very good sampling, is just one approach that could be used to select the representative subset. In general, that approach will perform slower, perhaps remarkably slower, than an approach that randomly selects the representative subset from the collection. For many or even most simulations, the random selection of the representative subset from the collection works well. Even an approach of sorting the collection of LOBs into a series and selecting every $n^{th}$ LOB in the series may perform relatively quickly and can be used. It also provides a known, measurable sized sub set.

In short, various possibilities exist for taking a representative sampling from the overall collection, and any desired approach can be used. The size of the representative subset is tailorable as desired. In some examples, it could be a percentage of the size of the overall collection. In other examples, it could be a fixed number based on any parameter. In general, the larger the sample size, the more accurate the resultant ellipses, but the longer the algorithm will take. Thus the subset size can be a parameter into the algorithm and tailored based on user needs.

Figure 10:
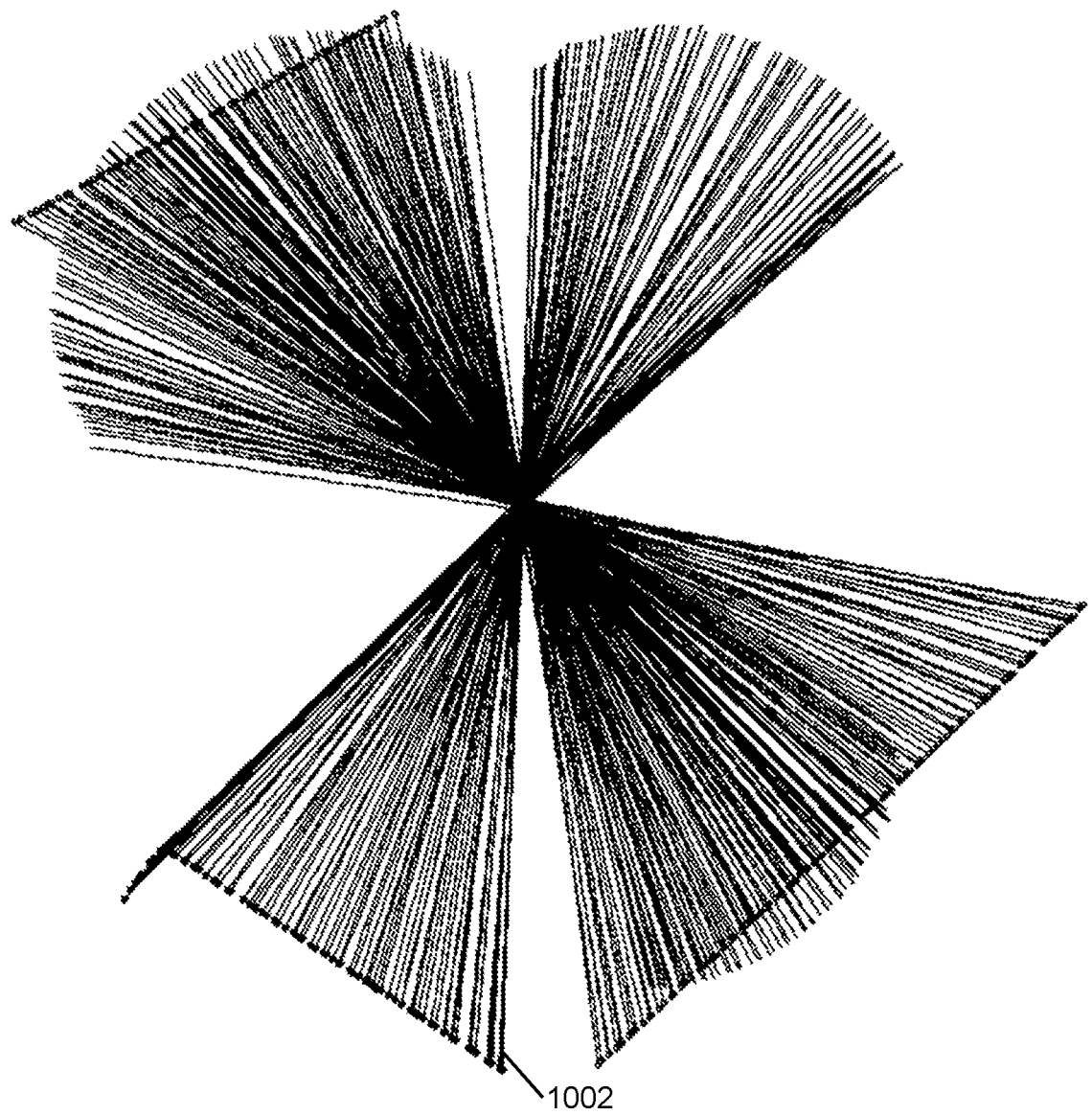
FIG. 10 depicts an example plot of a subset of LOBs selected as part of a quick-pick, quick-select geolocation algorithm in accordance with aspects described herein.

Using a representative subset selection method improves the QP algorithm to more quickly select near-optimal LOB clusters. This Quick-Pick, Quick-Select (QPQS) algorithm is able to handle initial LOB sets orders of magnitude more numerous than the QP algorithm while keeping runtime acceptably low and providing increased accuracy as compared to conventional approaches. As an example, consider a test case with over 1,000 LOBs collected and placed into the collection of LOBs. Taking the full collection of LOBs as the 'set of LOBs' on which the QP algorithm processes, the QP algorithm took roughly 90 seconds to run and produced a resultant ellipse with a center point 1.3 m from the true emitter location, with semi major and minor axis values of 37.67 m and 17.92 m, respectively. In comparison, the QS variant of the algorithm was used to select 250 LOBs as a representative subset of the full set of 1,000 LOBs. FIG. 10 depicts an example plot of that 250-LOB subset selected by the quick-select geolocation algorithm.

Figure 11:
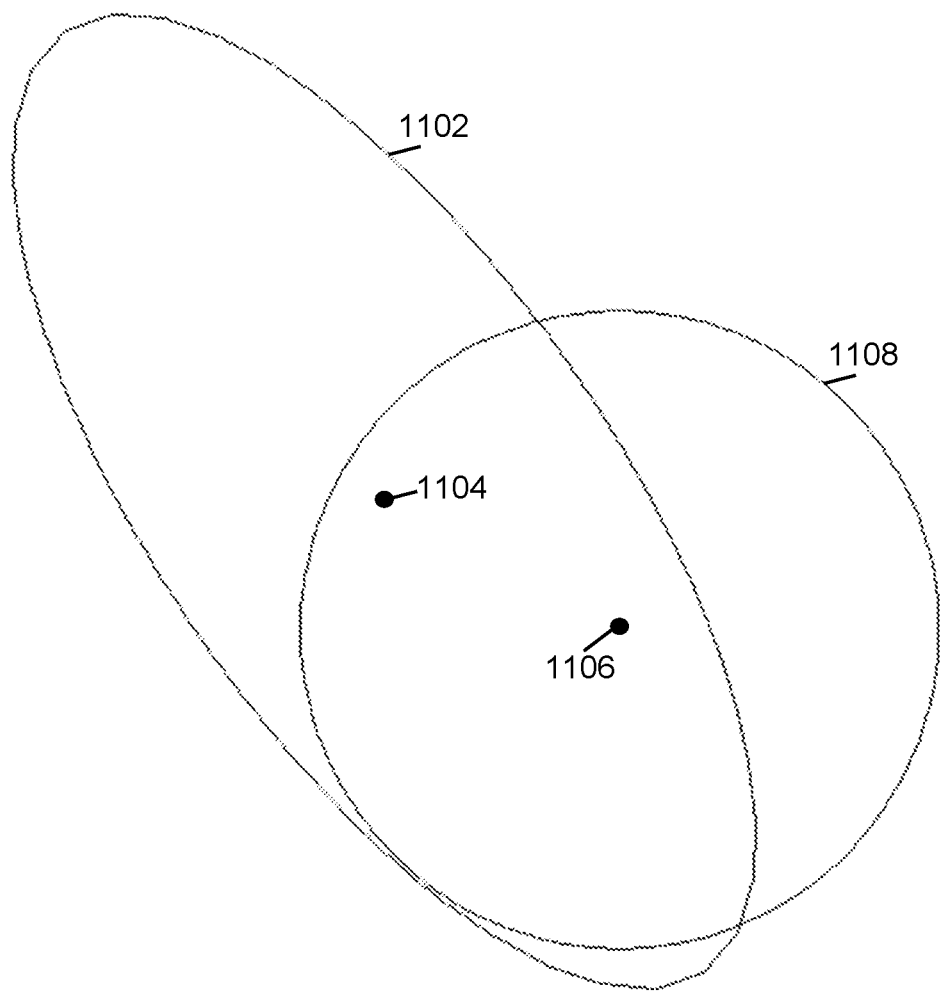
FIG. 11 depicts an example ascertained emitter location area generated by a quick-pick, quick-select geolocation algorithm in accordance with aspects described herein.

From the subset of LOBs 1002 in FIG. 10, the best cluster is selected (that is, the cluster with the most LOBs allocated to it under the QP approach above), and then LOBs from the full LOB set are assigned to that cluster, provided they point to it within their standard deviations. In this manner, an aspect of the QPQS algorithm backfills the identified best cluster by assigning to it additional LOBs, selected from the collection of LOBs, which were not included the representative sampling. Those additional LOBs selected from the collection to backfill the identified best cluster are selected and assigned to the identified cluster based on proximity of the additional LOBs to the identified cluster. Then when the algorithm progresses to determine the BPE and ascertained emitter location area, it determines that ascertained emitter location area based on the identified cluster that includes both the LOBs assigned from the representative sample, as well as the additional LOBs assigned thereto which were backfilled from the collection. The resultant emitter location area (e.g. ellipse in these examples) under this QPQS approach is therefore determined from the cluster that now additionally contains the additional assigned LOBs from the full LOB set. FIG. 11 depicts such an example ascertained emitter location area generated by a QPQS geolocation algorithm, in accordance with these aspects.

Referring to FIG. 11, the ascertained ellipse 1102 is centered at 1104, its BPE. The true emitter location is point 1106, encircled by a callout 1108. The center point 1104 of ellipse 1102 is 15.52 m from the true emitter location 1106, and the ellipse has semi-major and semi-minor axis values of 32.98 m and 13.3 m, respectively. These results are similar to those achieved with the QP algorithm but the QPQS algorithm took only 3.2 seconds to compute, down from 90 seconds taken by the QP algorithm. The size and location of ellipse 1102 relative to the true emitter location are also well-within the realm of what is acceptable, and even exceptional, given the runtime of the QPQS algorithm.

In an analogous scenario but with a starting/initial collection of 10,000 LOBs from which a representative subset was selected, the QPQS algorithm finished in 27 seconds, producing an ellipse 3.69 m from true emitter location, with semi-major and semi-minor axis values of 6.87 m and 2.77 m, respectively. All of these values are further improvements over the QP algorithm. Both the conventional algorithm (FIG. 1) and the QP algorithm (FIG. 8) do not complete processing of this high of a LOB count in a desirable and practical amount of time on an average modern computer system.

Figure 12:
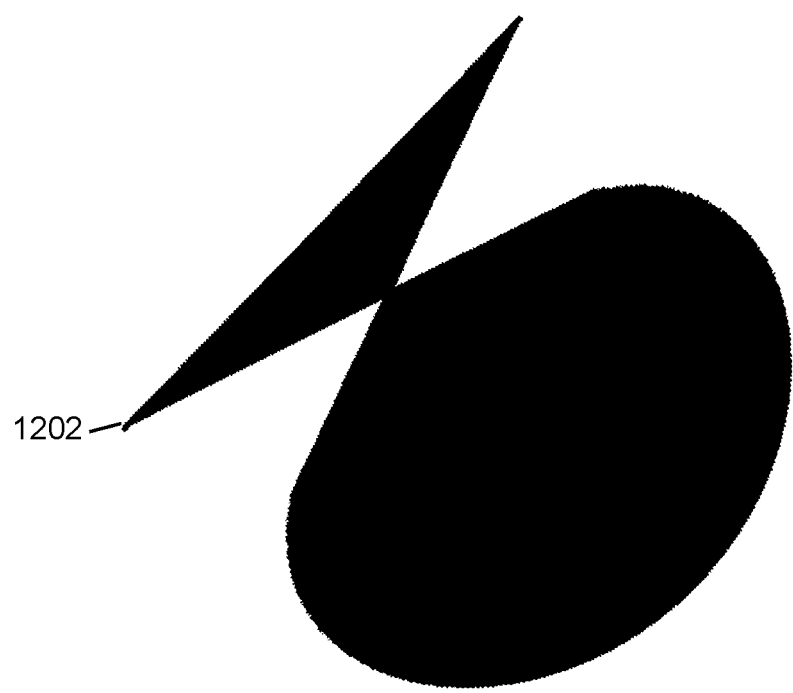
FIG. 12 depicts an example plot of a collection of LOBs prior to subset selection as part of a quick-pick, quick-select geolocation algorithm in accordance with aspects described herein.

As further demonstration, consider the following simulation using a starting/initial collection of 70,396 LOBs. FIG. 12 depicts the plot of this full set of all LOBs 1202, before subset selection as part of a QPQS geolocation algorithm in accordance with aspects described herein. The resulting ascertained emitter location area is an ellipse centered 0.3 m from the true emitter location, with semi-major and semi-minor axis values of 0.68 m and 0.21 m, respectively. The runtime of the QPQS algorithm in this example was 106.5 seconds.

In an example discussed above, the original algorithm processed 258 LOBs. The runtime of this was compared to that of a test with the QPQS algorithm processing a 25,866 LOB collection. Even with two orders of magnitude greater LOBs as input, the QPQS algorithm ran 90% faster than the original algorithm. The ellipse generated by the QPSP algorithm for this test case of 25,866 LOBs was 4.37 meters away from the true emitter location, with semi-major and semi-minor values of 5.38 meters and 2.75 meters, respectively.

Tables 7A, 7B, and 7C below present a comparison of the original, QP, and QPQS algorithms, respectively, for processing varying LOB counts to produce an ascertained emitter location area. The tables detail the run times, miss distances, ellipse statistics, and LOB counts for the single-emitter test case used as a baseline for various examples in this disclosure.

TABLE 7A

Original Algorithm

| Lobs | Time (ms) | Miss Distance | Semi-Major | Semi-Minor |
|---|---|---|---|---|
| 114 | 9,702 | 93.7 | 287.4 | 95.3 |
| 133 | 14,307 | 51.7 | 269.3 | 124.7 |
| 148 | 19,259 | 21.1 | 160.1 | 112.5 |
| 175 | 23,536 | 24.3 | 154.4 | 118.6 |
| 192 | 28,861 | 47.3 | 144.9 | 39.7 |

TABLE 7B

Quick-Pick Algorithm

| Lobs | Time (ms) | Miss Distance | Semi-Major | Semi-Minor |
|---|---|---|---|---|
| 114 | 808 | 93.7 | 287.4 | 95.3 |
| 136 | 1,084 | 44.7 | 248.7 | 124.7 |
| 153 | 1,730 | 15.7 | 156.0 | 61.5 |
| 175 | 1,976 | 24.3 | 154.4 | 118.6 |
| 195 | 2,024 | 44.9 | 143.7 | 39.6 |

TABLE 7C

Quick-Pick, Quick-Select Algorithm

| Lobs | Time (ms) | Miss Distance | Semi-Major | Semi-Minor |
|---|---|---|---|---|
| 104 | 427 | 94.9 | 316.6 | 90.1 |
| 1,031 | 2,267 | 12.6 | 31.8 | 17.9 |
| 10,323 | 12,805 | 9.1 | 11.3 | 4.8 |
| 50,611 | 67,415 | 3.7 | 4.2 | 2.0 |
| 101,322 | 119,428 | 1.6 | 1.6 | 0.7 |

Tables 7A-7C above clearly demonstrate the reductions in processing time of the QPQS algorithm and the increased emitter location area accuracy that can be obtained with such high LOB counts.

For multiple-emitter scenarios, the QPQS algorithm uses an iterative approach similar to that of the QP algorithm. The representative subset selection is performed once from the initial collection of LOBs. The QPQS algorithm identifies a best cluster, backfills the best cluster with one or more additional LOBs from the collection, and determines a BPE and ascertained emitter location area for an emitter based on the LOBs of that identified, backfilled best cluster. The LOBs of that cluster are removed from the LOB subset (the representative subset) and from the collection of LOBs. In this manner, the representative subset is reduced in size, as is the collection of LOBs. Any LOBs selected from the collection to backfill a cluster are no longer available for backfilling in a subsequent iteration. Assuming there are a threshold number of LOBs remaining in the representative subset, the algorithm iterates.

Thus, the QPQS algorithm, before processing a next iteration to identify a next emitter, updates (i) the representative subset of LOBs by removing from the subset those LOBs assigned to the identified cluster, and also (ii) the collection of LOBs by removing from the collection of LOBs the additional LOBs that were backfilled from the collection. The process returns to the generation of clusters (using the updated subset of LOBs). This iterating can repeat one or more times until, as an example, the set of LOBs has been updated to reduce the set of LOBs to at or below some threshold number of LOBs.

Table 8 below presents results comparing the QP and QPQS algorithms on runs of a collection of 857 lobs and 4,275 LOBs, respectively. The representative subset selection size for the QPQS algorithm was 360 LOBs from the collection of 4,275 LOBs.

TABLE 8

QP vs QPQS Algorithm, Multiple Emitter Test Case

| QP Total Lobs: 857 | | | | | QPQS Total Lobs: 4275 | | | | |
|---|---|---|---|---|---|---|---|---|---|
| Time (ms) | Lobs | Miss Distance (m) | Semi-Major (m) | Semi-Minor (m) | Time (ms) | Lobs | Miss Distance (m) | Semi-Major (m) | Semi-Minor (m) |
| 222670 | 137 | 90.16 | 328.38 | 143.02 | 14600 | 339 | 33.85 | 49.54 | 29.60 |
|  | 95 | 13.48 | 79.50 | 31.74 |  | 676 | −12.52 | 53.80 | 11.84 |
|  | 80 | 50.28 | 117.13 | 67.32 |  | 373 | −77.58 | 214.49 | 63.67 |
|  | 72 | 194.62 | 617.15 | 209.44 |  | 471 | 20.50 | 47.58 | 19.77 |
|  | 73 | 65.07 | 136.01 | 59.78 |  | 288 | −31.59 | 78.73 | 29.01 |
|  | 64 | 156.91 | 180.15 | 92.03 |  | 323 | 34.63 | 51.44 | 39.47 |

TABLE 8-continued

QP vs QPQS Algorithm, Multiple Emitter Test Case

| | QP Total Lobs: 857 | | | | QPQS Total Lobs: 4275 | | |
| --- | --- | --- | --- | --- | --- | --- | --- |
| Time (ms) | Lobs | Miss Distance (m) | Semi-Major (m) | Semi-Minor (m) | Time (ms) | Lobs | Miss Distance (m) | Semi-Major (m) | Semi-Minor (m) |
| | 65 | 60.99 | 182.60 | 30.56 | | 327 | −10.68 | 84.75 | 50.55 |
| | 62 | 17.42 | 317.86 | 208.53 | | 273 | 27.29 | 186.22 | 76.30 |
| | 57 | 268.89 | 468.53 | 115.81 | | 366 | 11.74 | 95.79 | 50.92 |
| | 55 | 97.37 | 199.99 | 173.55 | | 363 | 38.30 | 55.17 | 18.98 |
| | 13 | 35107.29 | 1629.68 | 207.44 | | 271 | −14.60 | 255.27 | 61.30 |
| | 10 | 65.32 | 4732.35 | 694.21 | | 44 | 3828.27 | 5899.83 | 671.80 |
| | 59 | 128.07 | 205.39 | 25.36 | | | | | |
| Averages | | 2793.53 | 707.29 | 158.37 | | | 320.63 | 589.38 | 93.60 |

The QPQS algorithm runs 93% faster, even with the much larger starting collection of LOBs (857 compared to 4,275), and its ellipse accuracy is generally better than that of the QP algorithm. On the point of accuracy, it is noted that the QPQS algorithm failed to detect an emitter that the QP algorithm detected. This indicated that, in this particular test, the QPQS algorithm may have suffered from possible over-simplification, resulting from the selection of the representative subset. However, given the relatively poor accuracy of the excluded ellipse that was found with the QP algorithm, it is also possible that the QPQS algorithm filtered an emitter for which there was insufficient reliable data, i.e. there were too few LOBs with too little variation to make a quality estimate of the emitter's location. In some examples, the situation could be addressed by tailoring the size of the representative subset—360 LOBs in the example above. The size of the representative subset selected from the collection could be a parameter that is tailored by a user and/or by machine learning, as examples.

Figure 13:
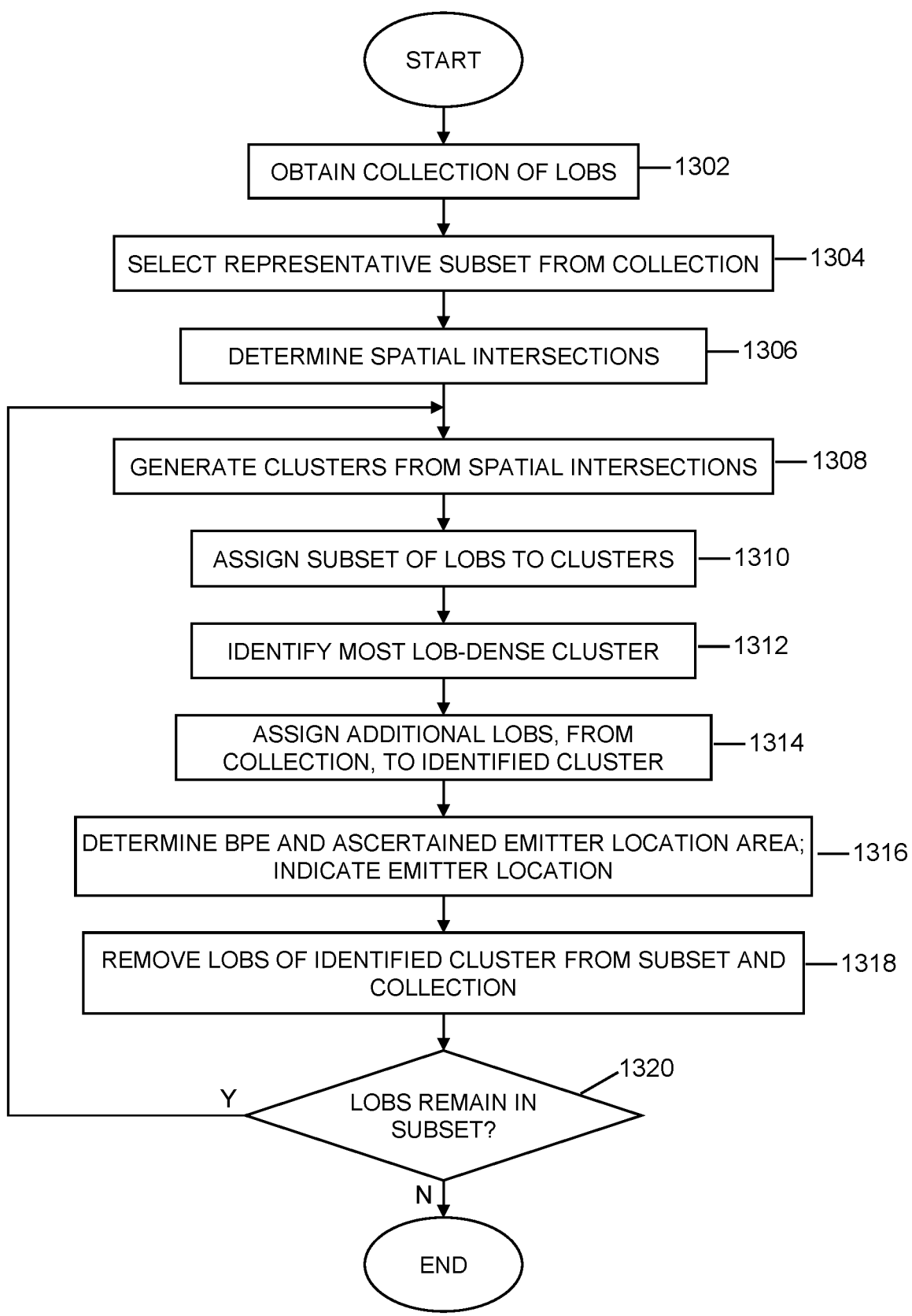
FIG. 13 depicts an example quick-pick, quick-select geolocation process in accordance with aspects described herein.

FIG. 13 depicts an example QPQS geolocation process in accordance with aspects described herein. In some examples, the process is performed by one or more computer systems, such as those described herein. The process incorporates aspects of the QP algorithm described above with reference to FIG. 8.

The process includes obtains a set of LOBs by initially obtaining (1302) a collection of LOBs indicative of one or more emitter locations and then selecting (1304) a subset of LOBs from the collection of LOBs. The selecting can include taking a representative sampling of LOBs from that collection of LOBs. This representative sampling/subset is used as the initial 'set of LOBs' against which to further process. The method determines (1306) spatial intersections of LOBs of that set of LOBs (the selected subset), with the spatial intersections informing locations of a plurality of clusters. The process generates (1308) a cluster at each intersection and assigns (1310) each LOB of the set (the representative subset) to a respective one or more clusters of the plurality of clusters based on proximity of the LOB to the one or more clusters. The method then identifies (1312) a cluster, of the plurality of clusters, having a greatest number of LOBs from the set (the representative subset) assigned thereto. The process then performs a backfill, in which it assigns (1314) to the identified cluster additional LOBs, which are selected from the collection of LOBs and which were not included the initial set of LOBs. The additional LOBs can be selected and assigned to the identified cluster based on proximity of those additional LOBs to the identified cluster. This results in a backfilled cluster from which an emitter location area is determined. In particular, the process determines (1316) a best point estimate of the identified cluster and an ascertained emitter location area based on the best point estimate and on the LOBs assigned to the identified cluster, and indicates a location of an emitter as the determined emitter location area.

At that point, the process can end (for example if it is known that the set of LOBs is obtained from only a single emitter), or optionally continue to 1318 to update the set (representative subset) of LOBs by removing from the set of LOBs those LOBs that were assigned to the identified cluster at 1310 and update the collection of LOBs by removing from the collection of LOBs the additional LOBs that were assigned to the identified cluster at 1314 as part of the backfill. The process can iterate back to 1308 if there are more emitters to identify. The process therefore proceeds by determining (1320) whether at least some threshold number of LOBs remain in the (now updated) set of LOBs. If so (1320, Y), the process iterates by returning to 1308 and repeating the generating a plurality of clusters, the assigning each LOB of the (now updated) set of LOBs, the identifying a cluster, the assigning additional LOBs to the identified cluster, the determining the best point estimate and ascertained emitter location area, the indicating a location, the updating the set of LOBs, and the updating the collection of LOBs. This repeating can iterate until the set of LOBs has been updated to reduce the set of LOBs to at or below some threshold number of LOBs. At each iteration of the repeating, the ascertained emitter location area that is determined on that iteration indicates a location of another emitter.

Provided is a small sampling of embodiments of the present disclosure, as described herein:

A1. A computer-implemented method comprising: obtaining a set of lines of bearing (LOBs) indicative of one or more emitter locations; determining spatial intersections of LOBs of the set of LOBs; generating a plurality of clusters informed by the spatial intersections; assigning each line of bearing (LOB) of the set of LOBs to a respective one or more clusters of the plurality of clusters based on proximity of the LOB to the one or more clusters; identifying a cluster, of the plurality of clusters, having a greatest number of LOBs from the set of LOBs assigned thereto; determining a best point estimate of the identified cluster and an ascertained emitter location area based on the best point estimate and on the LOBs assigned to the identified cluster; and indicating a location of an emitter as the ascertained emitter location area.

A2. The method of A1, further comprising: updating the set of LOBs by removing from the set of LOBs those LOBs assigned to the identified cluster; and repeating, one or more times, the generating a plurality of clusters, the assigning, the identifying a cluster, the determining a best point estimate and ascertained emitter location area, the indicating a location, and the updating the set of LOBs, wherein the repeating iterates until the set of LOBs has been updated to reduce the set of LOBs to at or below some threshold number of LOBs, and wherein, at each iteration of the repeating, the ascertained emitter location area indicates a location of another emitter.

A3. The method of A1 or A2, wherein the obtaining the set of LOBs comprises selecting the set of LOBs as a subset from a collection of LOBs.

A4. The method of A3, wherein the selecting comprises taking a representative sampling of LOBs from the collection of LOBs.

A5. The method of A4, wherein the selecting further comprises ordering the collection of LOBs in an order based on a property of each LOB of the collection of LOBs, and taking the representative sampling as every nth LOB of the ordered collection of LOBs, where n>1.

A6. The method of A3, wherein the selecting comprises iteratively identifying and adding to the set of LOBs a next LOB from the collection of LOBs, wherein the identifying the next LOB is based on (i) an orientation of the next LOB and (ii) an orientation of a LOB in the set of LOBs that is nearest-oriented to the next LOB.

A7. The method of A6, wherein the identifying the next LOB comprises identifying a LOB, of the collection of LOBs, having an orientation that differs greatest from an orientation of its nearest-oriented LOB in the set of LOBs, wherein the identifying selects that identified LOB as the next LOB to add to the set of LOBs.

A8. The method of A3, A4, A5, A6 or A7, further comprising assigning to the identified cluster additional LOBs, wherein the additional LOBs are selected from the collection of LOBs and which were not included in the set of LOBs, wherein the additional LOBs are selected and assigned to the identified cluster based on proximity of the additional LOBs to the identified cluster, and wherein the determining of the ascertained emitter location area is based on the identified cluster including the additional LOBs assigned thereto.

A9. The method of A8, further comprising: updating the set of LOBs by removing from the set of LOBs those LOBs assigned to the identified cluster; updating the collection of LOBs by removing from the collection of LOBs the additional LOBs assigned to the identified cluster and that were not included in the set of LOBs; and repeating, one or more times, the generating a plurality of clusters, the assigning each LOB of the set of LOBs, the identifying a cluster, the assigning additional LOBs to the identified cluster, the determining the best point estimate and ascertained emitter location area, the indicating a location, the updating the set of LOBs, and the updating the collection of LOBs, wherein the repeating iterates until the set of LOBs has been updated to reduce the set of LOBs to at or below some threshold number of LOBs, and wherein, at each iteration of the repeating, the ascertained emitter location area indicates a location of another emitter.

B1. A computer system comprising: a memory; and a processor in communication with the memory, wherein the computer system is configured to perform a method comprising: obtaining a set of lines of bearing (LOBs) indicative of one or more emitter locations; determining spatial intersections of LOBs of the set of LOBs; generating a plurality of clusters informed by the spatial intersections; assigning each line of bearing (LOB) of the set of LOBs to a respective one or more clusters of the plurality of clusters based on proximity of the LOB to the one or more clusters; identifying a cluster, of the plurality of clusters, having a greatest number of LOBs from the set of LOBs assigned thereto; determining a best point estimate of the identified cluster and an ascertained emitter location area based on the best point estimate and on the LOBs assigned to the identified cluster; and indicating a location of an emitter as the ascertained emitter location area.

B2. The computer system of B1, wherein the method further comprises: updating the set of LOBs by removing from the set of LOBs those LOBs assigned to the identified cluster; and repeating, one or more times, the generating a plurality of clusters, the assigning, the identifying a cluster, the determining a best point estimate and ascertained emitter location area, the indicating a location, and the updating the set of LOBs, wherein the repeating iterates until the set of LOBs has been updated to reduce the set of LOBs to at or below some threshold number of LOBs, and wherein, at each iteration of the repeating, the ascertained emitter location area indicates a location of another emitter.

B3. The computer system of B1 or B2, wherein the obtaining the set of LOBs comprises selecting the set of LOBs as a subset from a collection of LOBs.

B4. The computer system of B3, wherein the selecting comprises taking a representative sampling of LOBs from the collection of LOBs.

B5. The computer system of B4, wherein the selecting further comprises ordering the collection of LOBs in an order based on a property of each LOB of the collection of LOBs, and taking the representative sampling as every nth LOB of the ordered collection of LOBs, where n>1.

B6. The computer system of B3, wherein the selecting comprises iteratively identifying and adding to the set of LOBs a next LOB from the collection of LOBs, wherein the identifying the next LOB is based on (i) an orientation of the next LOB and (ii) an orientation of a LOB in the set of LOBs that is nearest-oriented to the next LOB.

B7. The computer system of B6, wherein the identifying the next LOB comprises identifying a LOB, of the collection of LOBs, having an orientation that differs greatest from an orientation of its nearest-oriented LOB in the set of LOBs, wherein the identifying selects that identified LOB as the next LOB to add to the set of LOBs.

B8. The computer system of B3, B4, B5, B6 or B7, wherein the method further comprises assigning to the identified cluster additional LOBs, wherein the additional LOBs are selected from the collection of LOBs and were not included in the set of LOBs, wherein the additional LOBs are selected and assigned to the identified cluster based on proximity of the additional LOBs to the identified cluster, and wherein the determining of the ascertained emitter location area is based on the identified cluster including the additional LOBs assigned thereto.

B9. The computer system of B8, wherein the method further comprises: updating the set of LOBs by removing from the set of LOBs those LOBs assigned to the identified cluster; updating the collection of LOBs by removing from the collection of LOBs the additional LOBs assigned to the identified cluster and that were not included in the set of LOBs; and repeating, one or more times, the generating a plurality of clusters, the assigning each LOB of the set of LOBs, the identifying a cluster, the assigning additional LOBs to the identified cluster, the determining the best point estimate and ascertained emitter location area, the indicating a location, the updating the set of LOBs, and the updating the collection of LOBs, wherein the repeating iterates until the set of LOBs has been updated to reduce the set of LOBs to at or below some threshold number of LOBs, and wherein, at each iteration of the repeating, the ascertained emitter location area indicates a location of another emitter.

C1. A computer program product comprising: a computer readable storage medium storing instructions for execution to perform a method comprising: obtaining a set of lines of bearing (LOBs) indicative of one or more emitter locations; determining spatial intersections of LOBs of the set of LOBs; generating a plurality of clusters informed by the spatial intersections; assigning each line of bearing (LOB) of the set of LOBs to a respective one or more clusters of the plurality of clusters based on proximity of the LOB to the one or more clusters; identifying a cluster, of the plurality of clusters, having a greatest number of LOBs from the set of LOBs assigned thereto; determining a best point estimate of the identified cluster and an ascertained emitter location area based on the best point estimate and on the LOBs assigned to the identified cluster; and indicating a location of an emitter as the ascertained emitter location area.

C2. The computer program product of C1, further comprising: updating the set of LOBs by removing from the set of LOBs those LOBs assigned to the identified cluster; and repeating, one or more times, the generating a plurality of clusters, the assigning, the identifying a cluster, the determining a best point estimate and ascertained emitter location area, the indicating a location, and the updating the set of LOBs, wherein the repeating iterates until the set of LOBs has been updated to reduce the set of LOBs to at or below some threshold number of LOBs, and wherein, at each iteration of the repeating, the ascertained emitter location area indicates a location of another emitter.

C3. The computer program product of C1 or C2, wherein the obtaining the set of LOBs comprises selecting the set of LOBs as a subset from a collection of LOBs.

C4. The computer program product of C3, wherein the selecting comprises taking a representative sampling of LOBs from the collection of LOBs.

C5. The computer program product of C4, wherein the selecting further comprises ordering the collection of LOBs in an order based on a property of each LOB of the collection of LOBs, and taking the representative sampling as every nth LOB of the ordered collection of LOBs, where n>1.

C6. The computer program product of C3, wherein the selecting comprises iteratively identifying and adding to the set of LOBs a next LOB from the collection of LOBs, wherein the identifying the next LOB is based on (i) an orientation of the next LOB and (ii) an orientation of a LOB in the set of LOBs that is nearest-oriented to the next LOB.

C7. The computer program product of C6, wherein the identifying the next LOB comprises identifying a LOB, of the collection of LOBs, having an orientation that differs greatest from an orientation of its nearest-oriented LOB in the set of LOBs, wherein the identifying selects that identified LOB as the next LOB to add to the set of LOBs.

C8. The computer program product of C3, C4, C5, C6 or C7, further comprising assigning to the identified cluster additional LOBs, wherein the additional LOBs are selected from the collection of LOBs and were not included in the set of LOBs, wherein the additional LOBs are selected and assigned to the identified cluster based on proximity of the additional LOBs to the identified cluster, and wherein the determining of the ascertained emitter location area is based on the identified cluster including the additional LOBs assigned thereto.

C9. The computer program product of C8, further comprising: updating the set of LOBs by removing from the set of LOBs those LOBs assigned to the identified cluster; updating the collection of LOBs by removing from the collection of LOBs the additional LOBs assigned to the identified cluster and that were not included in the set of LOBs; and repeating, one or more times, the generating a plurality of clusters, the assigning each LOB of the set of LOBs, the identifying a cluster, the assigning additional LOBs to the identified cluster, the determining the best point estimate and ascertained emitter location area, the indicating a location, the updating the set of LOBs, and the updating the collection of LOBs, wherein the repeating iterates until the set of LOBs has been updated to reduce the set of LOBs to at or below some threshold number of LOBs, and wherein, at each iteration of the repeating, the ascertained emitter location area indicates a location of another emitter.

Although various examples are provided, variations are possible without departing from a spirit of the claimed aspects.

Figure 14:
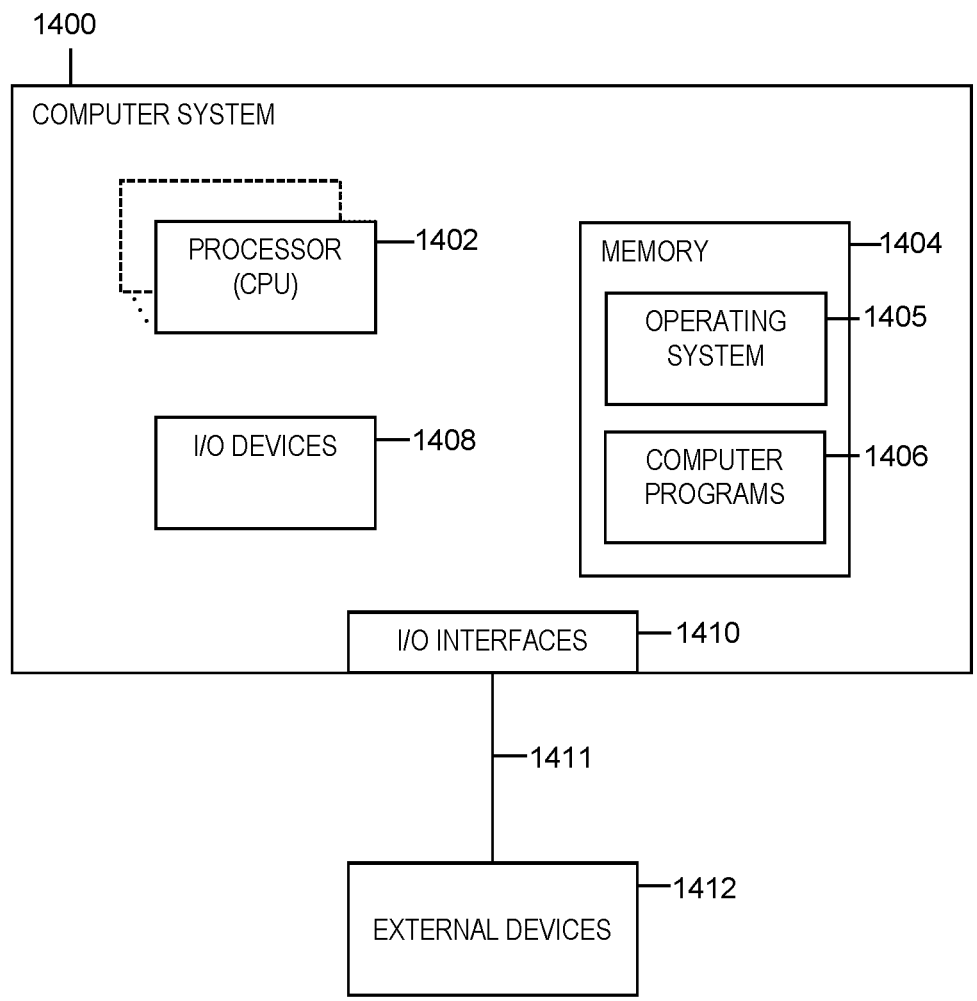
FIG. 14 depicts one example of a computer system and associated devices to incorporate and/or use aspects described herein.

Processes described herein may be performed singly or collectively by one or more computer systems. FIG. 14 depicts one example of such a computer system and associated devices to incorporate and/or use aspects described herein. A computer system may also be referred to herein as a data processing device/system, computing device/system/ node, or simply a computer. The computer system may be based on one or more of various system architectures and/or instruction set architectures, such as those offered by Intel Corporation (Santa Clara, Calif., USA) or ARM Holdings plc (Cambridge, England, United Kingdom), as examples.

FIG. 14 shows a computer system 1400 in communication with external device(s) 1412. Computer system 1400 includes one or more processor(s) 1402, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 1402 can also include register(s) to be used by one or more of the functional components. Computer system 1400 also includes memory 1404, input/output (I/O) devices 1408, and I/O interfaces 1410, which may be coupled to processor(s) 1402 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 1404 can be or include main or system memory (e.g. Random Access Memory) used in the execution of program instructions, storage device(s) such as hard drive(s), flash media, or optical media as examples, and/or cache memory, as examples. Memory 1404 can include, for instance, a cache, such as a shared cache, which may be coupled to local caches (examples include L1 cache, L2 cache, etc.) of processor(s) 1402. Additionally, memory 1404 may be or include at least one computer program product having a set (e.g., at least one) of program modules, instructions, code or the like that is/are configured to carry out functions of embodiments described herein when executed by one or more processors.

Memory 1404 can store an operating system 1405 and other computer programs 1406, such as one or more computer programs/applications that execute to perform aspects described herein. Specifically, programs/applications can include computer readable program instructions that may be configured to carry out functions of embodiments of aspects described herein.

Examples of I/O devices 1408 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (1412) coupled to the computer system through one or more I/O interfaces 1410.

Computer system 1400 may communicate with one or more external devices 1412 via one or more I/O interfaces 1410. Example external devices include a keyboard, a pointing device, a display, and/or any other devices that enable a user to interact with computer system 1400. Other example external devices include any device that enables computer system 1400 to communicate with one or more other computing systems or peripheral devices such as a printer. A network interface/adapter is an example I/O interface that enables computer system 1400 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 1410 and external devices 1412 can occur across wired and/or wireless communications link(s) 1411, such as Ethernet-based wired or wireless connections. Example wireless connections include cellular, Wi-Fi, Bluetooth®, proximity-based, near-field, or other types of wireless connections. More generally, communications link(s) 1411 may be any appropriate wireless and/or wired communication link(s) for communicating data.

Particular external device(s) 1412 may include one or more data storage devices, which may store one or more programs, one or more computer readable program instructions, and/or data, etc. Computer system 1400 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 1400 may be operational with numerous other general purpose or special purpose computing system environments or configurations. Computer system 1400 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

In some embodiments, aspects of the present invention may take the form of a computer program product, which may be embodied as computer readable medium(s). A computer readable medium may be a tangible storage device/medium having computer readable program code/instructions stored thereon. Example computer readable medium(s) include, but are not limited to, electronic, magnetic, optical, or semiconductor storage devices or systems, or any combination of the foregoing. Example embodiments of a computer readable medium include a hard drive or other mass-storage device, an electrical connection having wires, random access memory (RAM), read-only memory (ROM), erasable-programmable read-only memory such as EPROM or flash memory, an optical fiber, a portable computer disk/diskette, such as a compact disc read-only memory (CD-ROM) or Digital Versatile Disc (DVD), an optical storage device, a magnetic storage device, or any combination of the foregoing. The computer readable medium may be readable by a processor, processing unit, or the like, to obtain data (e.g. instructions) from the medium for execution. In a particular example, a computer program product is or includes one or more computer readable media that includes/stores computer readable program code to provide and facilitate one or more aspects described herein.

As noted, program instruction contained or stored in/on a computer readable medium can be obtained and executed by any of various suitable components such as a processor of a computer system to cause the computer system to behave and function in a particular manner. Such program instructions for carrying out operations to perform, achieve, or facilitate aspects described herein may be written in, or compiled from code written in, any desired programming language. In some embodiments, such programming language includes object-oriented and/or procedural programming languages such as C, C++, C#, Java, etc.

Program code can include one or more program instructions obtained for execution by one or more processors. Computer program instructions may be provided to one or more processors of, e.g., one or more computer systems, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   obtaining a set of lines of bearing (LOBs) indicative of one or more emitter locations;
   determining spatial intersections of LOBs of the set of LOBs;
   generating a plurality of clusters informed by the spatial intersections;
   assigning each line of bearing (LOB) of the set of LOBs to a respective one or more clusters of the plurality of clusters based on proximity of the LOB to the one or more clusters;
   identifying a cluster, of the plurality of clusters, having a greatest number of LOBs from the set of LOBs assigned thereto;
   determining a best point estimate of the identified cluster and an ascertained emitter location area based on the best point estimate and on the LOBs assigned to the identified cluster; and
   indicating a location of an emitter as the ascertained emitter location area.

2. The method of claim 1, further comprising:
   updating the set of LOBs by removing from the set of LOBs those LOBs assigned to the identified cluster; and
   repeating, one or more times, the generating a plurality of clusters, the assigning, the identifying a cluster, the determining a best point estimate and an emitter location area, the indicating a location, and the updating the set of LOBs, wherein the repeating iterates until the set of LOBs has been updated to reduce the set of LOBs to at or below some threshold number of LOBs, and wherein, at each iteration of the repeating, the ascertained emitter location area indicates a location of another emitter.

3. The method of claim 1, wherein the obtaining the set of LOBs comprises selecting the set of LOBs as a subset from a collection of LOBs.

4. The method of claim 3, wherein the selecting comprises taking a representative sampling of LOBs from the collection of LOBs.

5. The method of claim 4, wherein the selecting further comprises ordering the collection of LOBs in an order based on a property of each LOB of the collection of LOBs, and taking the representative sampling as every $n^{th}$ LOB of the ordered collection of LOBs, where n>1.

6. The method of claim 3, further comprising assigning to the identified cluster additional LOBs, wherein the additional LOBs are selected from the collection of LOBs and were not included in the set of LOBs, wherein the additional LOBs are selected and assigned to the identified cluster based on proximity of the additional LOBs to the identified cluster, and wherein the determining the ascertained emitter location area is based on the identified cluster including the additional LOBs assigned thereto.

7. The method of claim 6, further comprising:
   updating the set of LOBs by removing from the set of LOBs those LOBs assigned to the identified cluster;
   updating the collection of LOBs by removing from the collection of LOBs the additional LOBs assigned to the identified cluster and that were not included in the set of LOBs; and
   repeating, one or more times, the generating a plurality of clusters, the assigning each LOB of the set of LOBs, the identifying a cluster, the assigning additional LOBs to the identified cluster, the determining the best point estimate and ascertained emitter location area, the indicating a location, the updating the set of LOBs, and the updating the collection of LOBs, wherein the repeating iterates until the set of LOBs has been updated to reduce the set of LOBs to at or below some threshold number of LOBs, and wherein, at each iteration of the repeating, the ascertained emitter location area indicates a location of another emitter.

8. A computer system comprising:
   a memory; and
   a processor in communication with the memory, wherein the computer system is configured to perform a method comprising:
      obtaining a set of lines of bearing (LOBs) indicative of one or more emitter locations;
      determining spatial intersections of LOBs of the set of LOBs;
      generating a plurality of clusters informed by the spatial intersections;
      assigning each line of bearing (LOB) of the set of LOBs to a respective one or more clusters of the plurality of clusters based on proximity of the LOB to the one or more clusters;
      identifying a cluster, of the plurality of clusters, having a greatest number of LOBs from the set of LOBs assigned thereto;
      determining a best point estimate of the identified cluster and an ascertained emitter location area based on the best point estimate and on the LOBs assigned to the identified cluster; and
      indicating a location of an emitter as the ascertained emitter location area.

9. The computer system of claim 8, wherein the method further comprises:
   updating the set of LOBs by removing from the set of LOBs those LOBs assigned to the identified cluster; and
   repeating, one or more times, the generating a plurality of clusters, the assigning, the identifying a cluster, the determining a best point estimate and an emitter location area, the indicating a location, and the updating the set of LOBs, wherein the repeating iterates until the set of LOBs has been updated to reduce the set of LOBs to at or below some threshold number of LOBs, and wherein, at each iteration of the repeating, the ascertained emitter location area indicates a location of another emitter.

10. The computer system of claim 8, wherein the obtaining the set of LOBs comprises selecting the set of LOBs as a subset from a collection of LOBs.

11. The computer system of claim 10, wherein the selecting comprises taking a representative sampling of LOBs from the collection of LOBs.

12. The computer system of claim 11, wherein the selecting further comprises ordering the collection of LOBs in an order based on a property of each LOB of the collection of LOBs, and taking the representative sampling as every $n^{th}$ LOB of the ordered collection of LOBs, where n>1.

13. The computer system of claim 10, wherein the method further comprises assigning to the identified cluster additional LOBs, wherein the additional LOBs are selected from the collection of LOBs and were not included in the set of LOBs, wherein the additional LOBs are selected and assigned to the identified cluster based on proximity of the additional LOBs to the identified cluster, and wherein the determining the ascertained emitter location area is based on the identified cluster including the additional LOBs assigned thereto.

14. The computer system of claim 13, wherein the method further comprises:
updating the set of LOBs by removing from the set of LOBs those LOBs assigned to the identified cluster;
updating the collection of LOBs by removing from the collection of LOBs the additional LOBs assigned to the identified cluster and that were not included in the set of LOBs; and
repeating, one or more times, the generating a plurality of clusters, the assigning each LOB of the set of LOBs, the identifying a cluster, the assigning additional LOBs to the identified cluster, the determining the best point estimate and ascertained emitter location area, the indicating a location, the updating the set of LOBs, and the updating the collection of LOBs, wherein the repeating iterates until the set of LOBs has been updated to reduce the set of LOBs to at or below some threshold number of LOBs, and wherein, at each iteration of the repeating, the ascertained emitter location area indicates a location of another emitter.

15. A computer program product comprising: a non-transitory computer readable storage medium storing instructions for execution to perform a method comprising: obtaining a set of lines of bearing (LOBs) indicative of one or more emitter locations; determining spatial intersections of LOBs of the set of LOBs; generating a plurality of clusters informed by the spatial intersections; assigning each line of bearing (LOB) of the set of LOBs to a respective one or more clusters of the plurality of clusters based on proximity of the LOB to the one or more clusters; identifying a cluster, of the plurality of clusters, having a greatest number of LOBs from the set of LOBs assigned thereto; determining a best point estimate of the identified cluster and an ascertained emitter location area based on the best point estimate and on the LOBs assigned to the identified cluster; and indicating a location of an emitter as the ascertained emitter location area.

16. The computer program product of claim 15, wherein the method further comprises:
updating the set of LOBs by removing from the set of LOBs those LOBs assigned to the identified cluster; and
repeating, one or more times, the generating a plurality of clusters, the assigning, the identifying a cluster, the determining a best point estimate and an emitter location area, the indicating a location, and the updating the set of LOBs, wherein the repeating iterates until the set of LOBs has been updated to reduce the set of LOBs to at or below some threshold number of LOBs, and wherein, at each iteration of the repeating, the ascertained emitter location area indicates a location of another emitter.

17. The computer program product of claim 15, wherein the obtaining the set of LOBs comprises selecting the set of LOBs as a subset from a collection of LOBs, wherein the selecting comprises taking a representative sampling of LOBs from the collection of LOBs.

18. The computer program product of claim 17, wherein the selecting further comprises ordering the collection of LOBs in an order based on a property of each LOB of the collection of LOBs, and taking the representative sampling as every $n^{th}$ LOB of the ordered collection of LOBs, where n>1.

19. The computer program product of claim 17, wherein the method further comprises assigning to the identified cluster additional LOBs, wherein the additional LOBs are selected from the collection of LOBs and were not included in the set of LOBs, wherein the additional LOBs are selected and assigned to the identified cluster based on proximity of the additional LOBs to the identified cluster, and wherein the determining the ascertained emitter location area is based on the identified cluster including the additional LOBs assigned thereto.

20. The computer program product of claim 19, wherein the method further comprises:
updating the set of LOBs by removing from the set of LOBs those LOBs assigned to the identified cluster;
updating the collection of LOBs by removing from the collection of LOBs the additional LOBs assigned to the identified cluster and that were not included in the set of LOBs; and
repeating, one or more times, the generating a plurality of clusters, the assigning each LOB of the set of LOBs, the identifying a cluster, the assigning additional LOBs to the identified cluster, the determining the best point estimate and ascertained emitter location area, the indicating a location, the updating the set of LOBs, and the updating the collection of LOBs, wherein the repeating iterates until the set of LOBs has been updated to reduce the set of LOBs to at or below some threshold number of LOBs, and wherein, at each iteration of the repeating, the ascertained emitter location area indicates a location of another emitter.

* * * * *